(12) United States Patent
Mei et al.

(10) Patent No.: US 12,029,977 B2
(45) Date of Patent: Jul. 9, 2024

(54) METHOD AND APPARATUS FOR GENERATING SPECIAL EFFECT IN VIRTUAL ENVIRONMENT, DEVICE, AND STORAGE MEDIUM

(71) Applicant: Tencent Technology (Shenzhen) Company Limited, Shenzhen (CN)

(72) Inventors: Yingjie Mei, Shenzhen (CN); Zhengguo Han, Shenzhen (CN); Lili Hao, Shenzhen (CN); Xianqi Jing, Shenzhen (CN); Chuan Lv, Shenzhen (CN); Zhaoyang Li, Shenzhen (CN); Ruowei Jiang, Shenzhen (CN); Jun Zhang, Shenzhen (CN); Xiaoqiang Hong, Shenzhen (CN); Lichao Wu, Shenzhen (CN); Jiabin Liang, Shenzhen (CN); Yi Wang, Shenzhen (CN); Yingtong Liu, Shenzhen (CN); Hao Meng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 273 days.

(21) Appl. No.: 17/750,175

(22) Filed: May 20, 2022

(65) Prior Publication Data

US 2022/0379208 A1 Dec. 1, 2022

Related U.S. Application Data

(63) Continuation of application No. PCT/CN2021/126212, filed on Oct. 25, 2021.

(30) Foreign Application Priority Data

May 28, 2021 (CN) .......................... 202110591807.7

(51) Int. Cl.
*A63F 13/52* (2014.01)
*A63F 13/35* (2014.01)
*G06T 13/20* (2011.01)

(52) U.S. Cl.
CPC .............. *A63F 13/52* (2014.09); *A63F 13/35* (2014.09); *G06T 13/20* (2013.01); *G06T 2200/24* (2013.01)

(58) Field of Classification Search
CPC .......... A63F 13/52; A63F 13/35; A63F 13/53; A63F 13/822; A63F 13/795;
(Continued)

(56) References Cited

U.S. PATENT DOCUMENTS

2008/0261696 A1* 10/2008 Yamazaki ............. A63F 13/212
463/43
2012/0196678 A1 8/2012 Fujisawa et al.
2020/0338449 A1 10/2020 Fan

FOREIGN PATENT DOCUMENTS

CN 104606883 A 5/2015
CN 104618797 A 5/2015
(Continued)

OTHER PUBLICATIONS

The Polygon Pilgrim, "Unity 2019—Ultimate Battle Royale Series-4-PUN2—Dynamic Loading Screen!", https://www.youtube.com/watch?v=khxcWn7cBHc&t=42s, Dec. 8, 2020 (Year: 2020).*
(Continued)

*Primary Examiner* — Michael A Cuff
(74) *Attorney, Agent, or Firm* — Morgan, Lewis & Bockius LLP

(57) ABSTRACT

A method for generating a special effect for social networking interaction in a virtual environment of a game is performed by an electronic device. The method includes: displaying an object presentation interface of a target battle of
(Continued)

the game when loading a virtual scene corresponding to the target battle, the object presentation interface being used for displaying a plurality of virtual objects participating in the target battle; receiving a special effect generating instruction for a first virtual object of the plurality of virtual objects, the special effect generating instruction being used for instructing to generate a special effect based on the first virtual object, and the first virtual object corresponding to a user of the electronic device triggering the special effect; and generating the special effect identifying the first virtual object in the object presentation interface.

20 Claims, 20 Drawing Sheets

(58) Field of Classification Search
CPC .. A63F 13/537; A63F 13/55; A63F 2300/308; G06T 13/20; G06T 2200/24
USPC .......................................................... 463/31
See application file for complete search history.

(56) References Cited

FOREIGN PATENT DOCUMENTS

| | | |
|---|---|---|
| CN | 104866101 A | 8/2015 |
| CN | 107333166 A | 11/2017 |
| CN | 110711380 A | 1/2020 |
| CN | 111282277 A | 6/2020 |
| CN | 111462307 A | 7/2020 |
| CN | 111672099 A | 9/2020 |
| CN | 111773684 A | 10/2020 |
| CN | 111913624 A | 11/2020 |
| CN | 112057860 A | 12/2020 |
| CN | 113181645 A | 7/2021 |
| JP | 2011078649 A | 4/2011 |
| TW | 200642737 A | 12/2006 |

OTHER PUBLICATIONS

Breaking news master—Daji baby—glory of the king, "Experience Server Breaks (2) | Optimized Social Interaction in the New Season, Convenient General Selection, Personalized Loading Interface", weixin.qq.com, Jun. 1, 2021, 6 pgs., Retrieved from the Internet: https://mp.weixin.qq.com/s/Xsqs0eplrj-Gw8db-q_RVQ.

King Linghu commentary, "The New Version of the Game Interface Cheers and Likes System is Online, it Contains Hidden Information, You Should Pay Attention to It!", Baidu, Apr. 10, 2020, 3 pgs., Retrieved from the Internet: https://baijiahao.baidu.com/s?id=1663508763994311162&wfr=spider&for=pc.

"The Gas System is Pretty Fun", Bilibili, Apr. 2, 2020, 3 pgs., Retrieved from the Internet: https://www.bilibili.com/video/BV1NZ4ylj7Kv/?spm_id_from=333.788.recommend_more_video.3&vd_source=cf40494a85ec30980e4a0070d2cacd09.

"A New Function for Quick Communication, which Can Display the Status of the Enemy's Ultimate Move, Actively Admit Mistakes and Surrender to Encourage", Bilibili, Mar. 12, 2021, 3 pgs., Retrieved from the Internet: https://www.bilibili.com/video/BV1Qp4y1H7yR/?spm_id_from=333.1007.top_right_bar_window_history.content.click&vd_source=cf40494a85ec30980e4a0070d2cacd09.

Tencent Technology, Australian Office Action, AU Patent Application No. 2021385098 Oct. 30, 2023, 3 pgs.

Tencent Technology, WO, PCT/CN2021/126212, Feb. 22, 2022, 5 pgs.

Tencent Technology, IPRP, PCT/CN2021/126212, Nov. 21, 2023, 6 pgs.

IQIYI, "Peace Elite: Is the Dancing God Synchronized?", Jul. 2, 2020, 1 pg. Retrieved from the Internet: https://www.iqiyi.com/v_19rzcffm7s.html.

Tencent Technology, Australian Office Action, AU Patent Application No. 2021385098, May 19, 2023, 3 pgs.

Tencent Technology, Australian Office Action, AU Application No. 2021385098, Feb. 20, 2024, 3 pgs.

Tencent Technology, ISR, PCT/CN2021/126212, Feb. 25, 2022, 3 pgs.

Tencent Technology, Canadian Office Action, CA Patent Application No. 3,164,842, Aug. 18, 2023, 5 pgs.

Tencent Technology, Korean Office Action, KR Application No. 10-2022-7017379, Mar. 26, 2024, 9 pgs.

YouTube.com—"[Grand Thanksgiving Leader Skill Challenge (Combo Edition)]" Puzzle & Dragon—Leader Skill, If you complete a combo, you will receive an egg as a reward (I'm not saying it's easy haha), Retrieved from the Internet: https://www.youtube.com/watch?v=nuGvtltj7Lc., Jan. 2021, 2 pgs.

* cited by examiner

METHOD AND APPARATUS FOR GENERATING SPECIAL EFFECT IN VIRTUAL ENVIRONMENT, DEVICE, AND STORAGE MEDIUM

CROSS-REFERENCE TO RELATED APPLICATIONS

This application is a continuation application of PCT Patent Application No. PCT/CN2021/126212, entitled "METHOD, APPARATUS, DEVICE AND STORAGE MEDIUM FOR GENERATING SPECIAL EFFECTS IN VIRTUAL ENVIRONMENT" filed on Oct. 25, 2021, which claims priority to Chinese Patent Application No. 202110591807.7, filed with the State Intellectual Property Office of the People's Republic of China on May 28, 2021, and entitled "SPECIAL EFFECT DISPLAY METHOD AND APPARATUS, ELECTRONIC DEVICE, AND STORAGE MEDIUM", all of which are incorporated herein by reference in their entirety.

FIELD OF THE TECHNOLOGY

This application relates to the field of computer technologies, and in particular, to a method and an apparatus for generating a special effect in a virtual environment, a device, and a storage medium.

BACKGROUND OF THE DISCLOSURE

With the development of computer technologies and diversification of terminal functions, there are increasing types of games that can be run on a terminal. A multiplayer online battle arena (MOBA) game is a relatively popular game.

SUMMARY

Embodiments of this application provide a method and an apparatus for generating a special effect in a virtual environment, a device, and a storage medium, and the technical solutions are as follows:

According to an aspect, a method for generating a special effect for social networking interaction in a virtual environment of a game is performed by an electronic device, the method comprising:
  displaying an object presentation interface of a target battle of the game when loading a virtual scene corresponding to the target battle, the object presentation interface being used for displaying a plurality of virtual objects participating in the target battle;
  receiving a special effect generating instruction for a first virtual object of the plurality of virtual objects, the special effect generating instruction being used for instructing to generate a special effect based on the first virtual object, and the first virtual object corresponding to a user of the electronic device triggering the special effect; and
  generating the special effect identifying the first virtual object in the object presentation interface.

According to an aspect, an electronic device is provided, including one or more processors and one or more memories, the one or more memories storing at least one computer program, the at least one computer program being loaded and executed by the one or more processors to cause the electronic device to implement the method for generating a special effect for social networking interaction in a virtual environment of a game according to any one of the foregoing possible implementations.

According to an aspect, a non-transitory computer-readable storage medium is provided, storing at least one computer program, the at least one computer program being loaded and executed by a processor of an electronic device to cause the electronic device to implement the method for generating a special effect for social networking interaction in a virtual environment of a game according to any one of the foregoing possible implementations.

BRIEF DESCRIPTION OF THE DRAWINGS

To describe the technical solutions in the embodiments of this application more clearly, the following briefly describes the accompanying drawings required for describing the embodiments.

DESCRIPTION OF EMBODIMENTS

Figure 1:
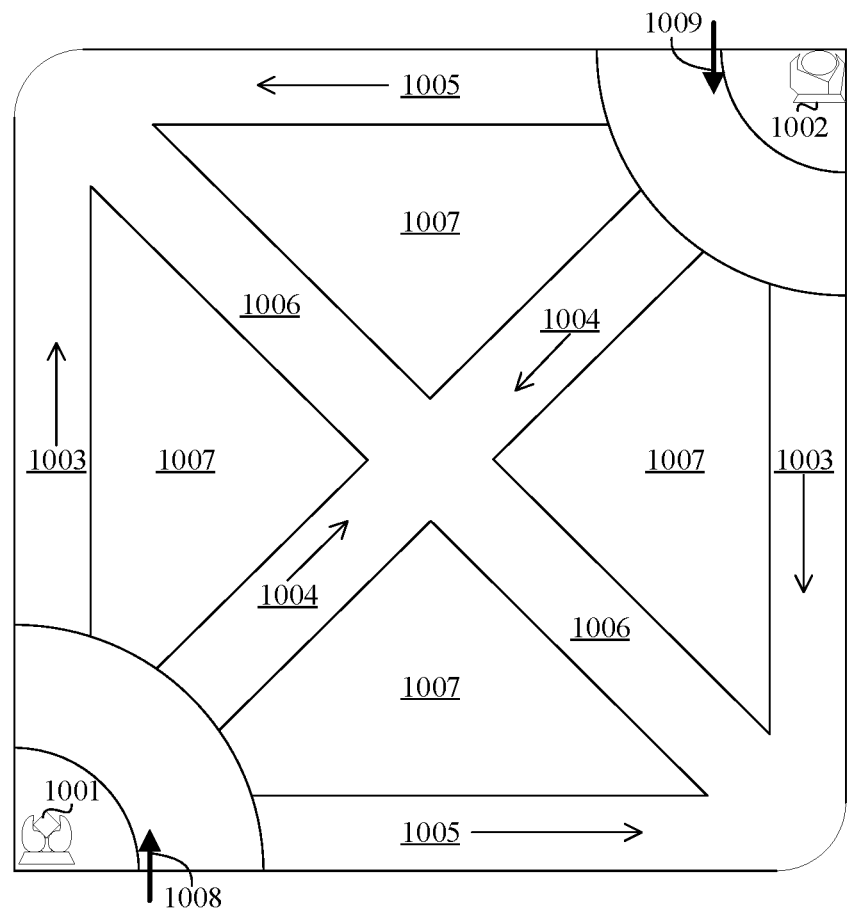
FIG. 1 is a virtual scene of a typical MOBA game according to an exemplary embodiment of this application.

To make the objectives, technical solutions, and advantages of this application clearer, the following further describes implementations of this application in detail with reference to the accompanying drawings.

Virtual scene: It is a virtual scene displayed (or provided) by an application when run on a terminal. The virtual scene is a simulated environment of a real world, or a semi-simulated semi-fictional virtual environment, or an entirely fictional virtual environment. In some embodiments, a virtual scene is also referred to as a virtual environment.

Virtual object: a movable object in a virtual scene. The movable object is a virtual character, a virtual animal, a virtual elf, a cartoon character, or the like, for example, a character, an animal, a plant, an oil drum, a wall, or a stone displayed in a virtual scene. The virtual object is a virtual image used for representing a user in the virtual scene. The virtual scene may include a plurality of virtual objects, and each virtual object has a shape and a volume in the virtual scene, and occupies some space in the virtual scene. In some embodiments, when the virtual scene is a three-dimensional virtual scene, the virtual object is a three-dimensional model, the three-dimensional model is a three-dimensional character constructed based on a three-dimensional human skeleton technology, and the same virtual object may show different appearances by wearing different skins.

In some embodiments, the virtual object is a player character controlled through an operation on a client, or a non-player character (NPC) set in a virtual scene interaction. In some embodiments, the virtual object is a virtual character for competition in a virtual scene. In some embodiments, a quantity of virtual objects participating in the interaction in the virtual scene is preset, or is dynamically determined according to a quantity of clients participating in the interaction.

A MOBA game is a game in which several forts are provided in a virtual scene, and users on different camps control virtual objects to battle in the virtual scene, occupy forts or destroy forts of the opposing camp. For example, a MOBA game may divide users into at least two opposing camps, and different virtual teams on the at least two opposing camps occupy respective map regions, and compete against each other using specific victory conditions as goals. The victory conditions include, but are not limited to at least one of occupying forts or destroy forts of the opposing camps, killing virtual objects in the opposing camps, ensure own survivals in a specified scenario and time, seizing a specific resource, and outscoring the opponent within a specified time. For example, in the MOBA game, the users may be divided into two opposing camps. The virtual objects controlled by the users are scattered in the virtual scene to compete against each other, and the victory condition is to destroy or occupy all enemy forts.

In some embodiments, each virtual team includes one or more virtual objects, such as 1, 2, 3, or 5. According to a quantity of virtual objects in each team participating in the battle arena, the battle arena may be divided into 1V1 competition, 2V2 competition, 3V3 competition, 5V5 competition, and the like. 1V1 means "1 vs. 1", and details are not described herein.

In some embodiments, the MOBA game may take place in rounds (or turns), and each round of the battle arena may have the same map or different maps. A duration of one round of the MOBA game is from a moment at which the game starts to a movement at which the victory condition is met.

In the MOBA games, users may further control the virtual objects to cast virtual skills to fight with target virtual objects. For example, the skill types of the virtual skills may include an attack skill, a defense skill, a healing skill, an auxiliary skill, a beheading skill, and the like. In some embodiments, there is a correspondence between each virtual object and one or more preset virtual skills. In some embodiments, a quantity of virtual skills having a correspondence with each virtual object is greater than or equal to a quantity of virtual skills with which each virtual object may be adorned in a battle.

Before a round of MOBA game starts, a user pre-selects a virtual object to fight in the current round of game, and clicks/taps a battle start option, a terminal loads a virtual scene, and the user may enter the current round of game only after waiting in a scene loading interface until the loading is completed. In the foregoing process, when the user is waiting for the loading of the virtual scene, man-machine interaction efficiency is low, and user experience is poor.

Two Typical MOBA Games are Separately Described Below.

First Typical MOBA Game.

FIG. 1 is a two-dimensional map of a virtual scene of a typical MOBA game. In this typical MOBA game, virtual characters are divided into a red-party camp and a blue-party camp, each camp has five virtual characters, and a total of ten virtual characters jointly perform a MOBA game battle.

Figure 2:
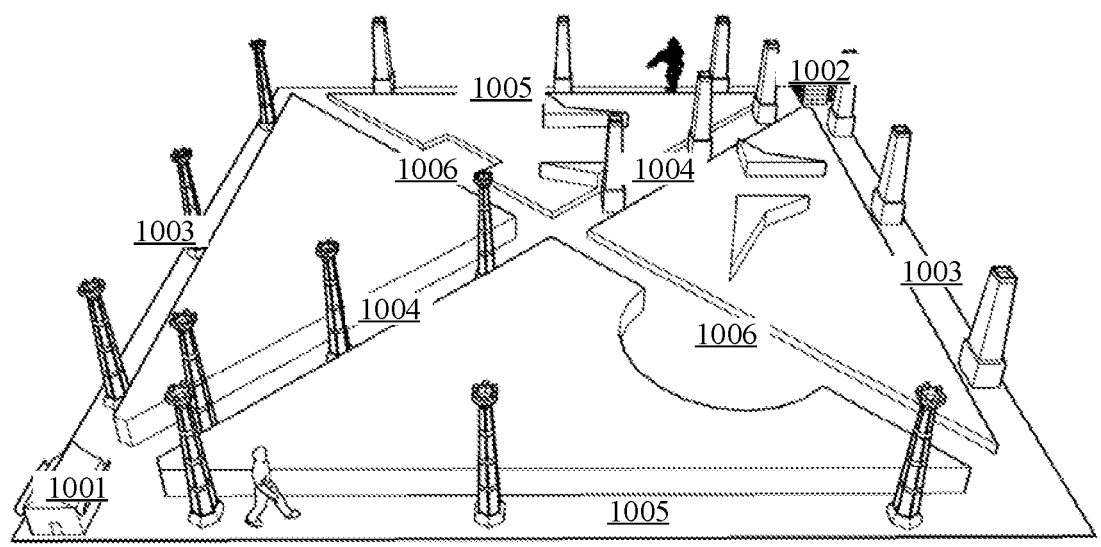
FIG. 2 is a schematic diagram of a virtual scene observed at a viewing angle of a blue party according to another exemplary embodiment of this application.
Figure 3:
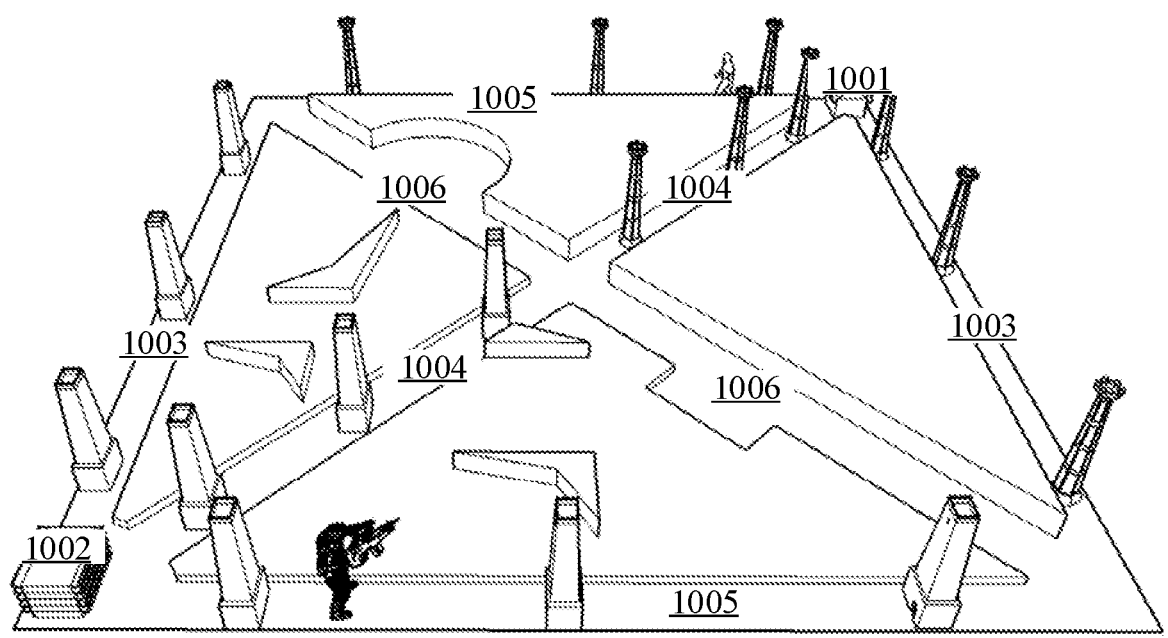
FIG. 3 is a schematic diagram of a virtual scene observed at a viewing angle of a red party according to another exemplary embodiment of this application.

As shown in FIG. 1, the map of the virtual scene is in the shape of a square, and is divided into the following several parts: bases (crystals) of the two camps at two ends of a diagonal line of the square respectively, that is, a blue-party base 1001 and a red-party base 1002; three attack routes connecting the blue-party base 1001 to the red-party base 1002 and being an upper route 1003, an intermediate route 1004, and a lower route 1005 respectively; a public region, being a river 1006; and a wild zone 1007. For example, as shown in FIG. 2, it is a virtual scene observed at a first viewing angle 1008 of a blue-party virtual character, where a blue-party base 1001 is located in a lower left corner of a picture of the virtual scene. As shown in FIG. 3, it is a virtual scene observed at a second viewing angle 1009 of a red-party virtual character, where a red-party base 1002 is located in a lower left corner of a picture of the virtual scene.

Figure 4:
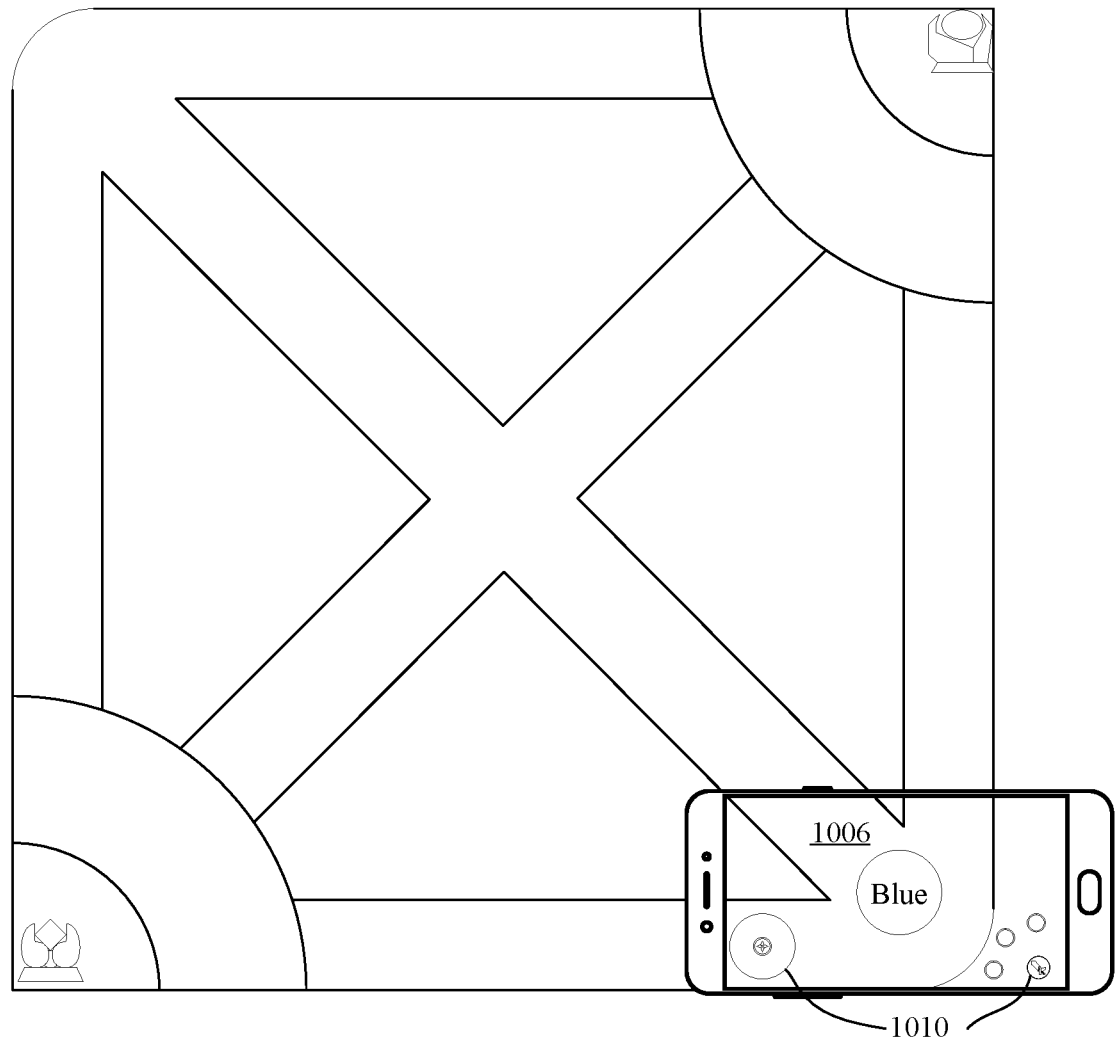
FIG. 4 is a schematic diagram of displaying a user interface on a terminal according to another exemplary embodiment of this application.
Figure 5:
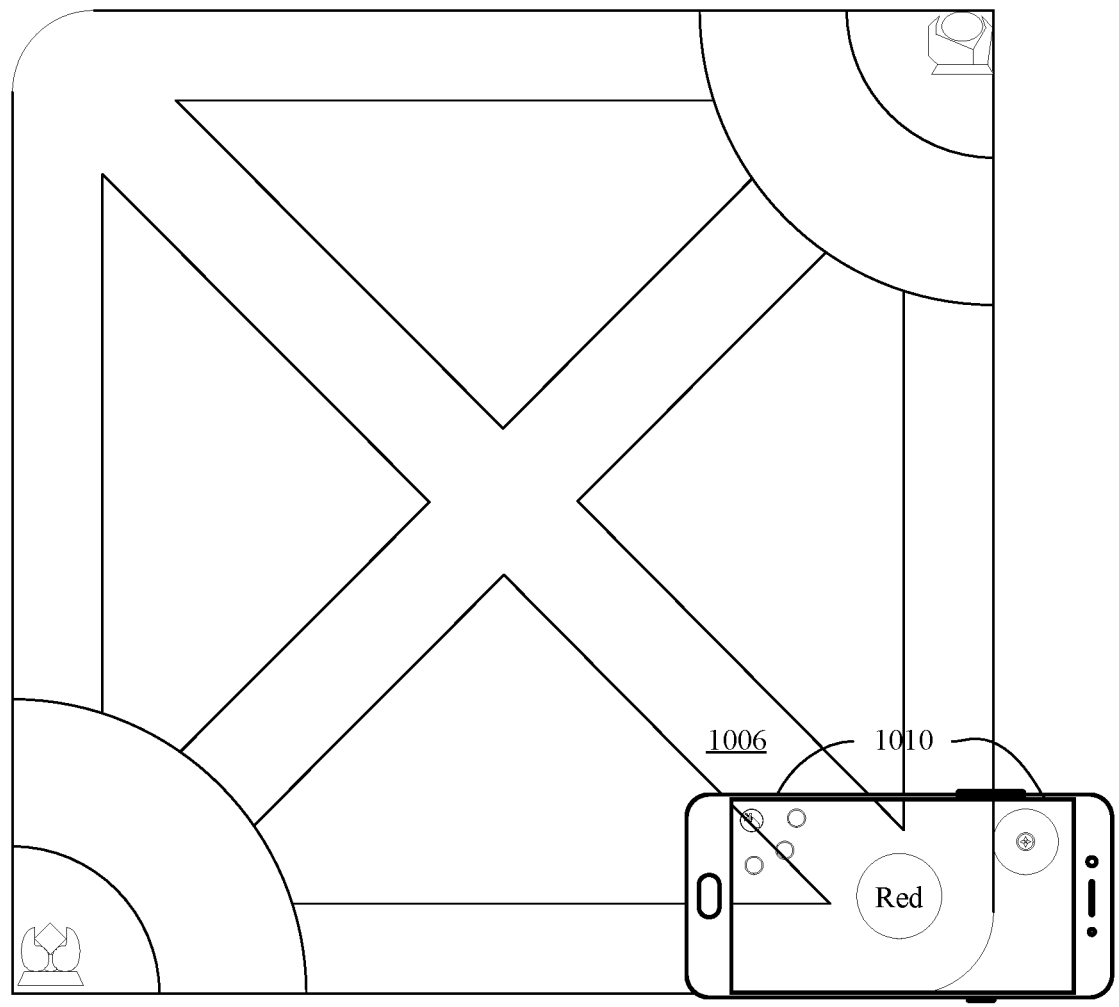
FIG. 5 is a schematic diagram of displaying a user interface on a terminal according to another exemplary embodiment of this application.

A user interface seen by a blue-party user on a terminal is shown in FIG. 4. A user interface seen by a red-party user on a terminal is shown in FIG. 5.

Figure 6:
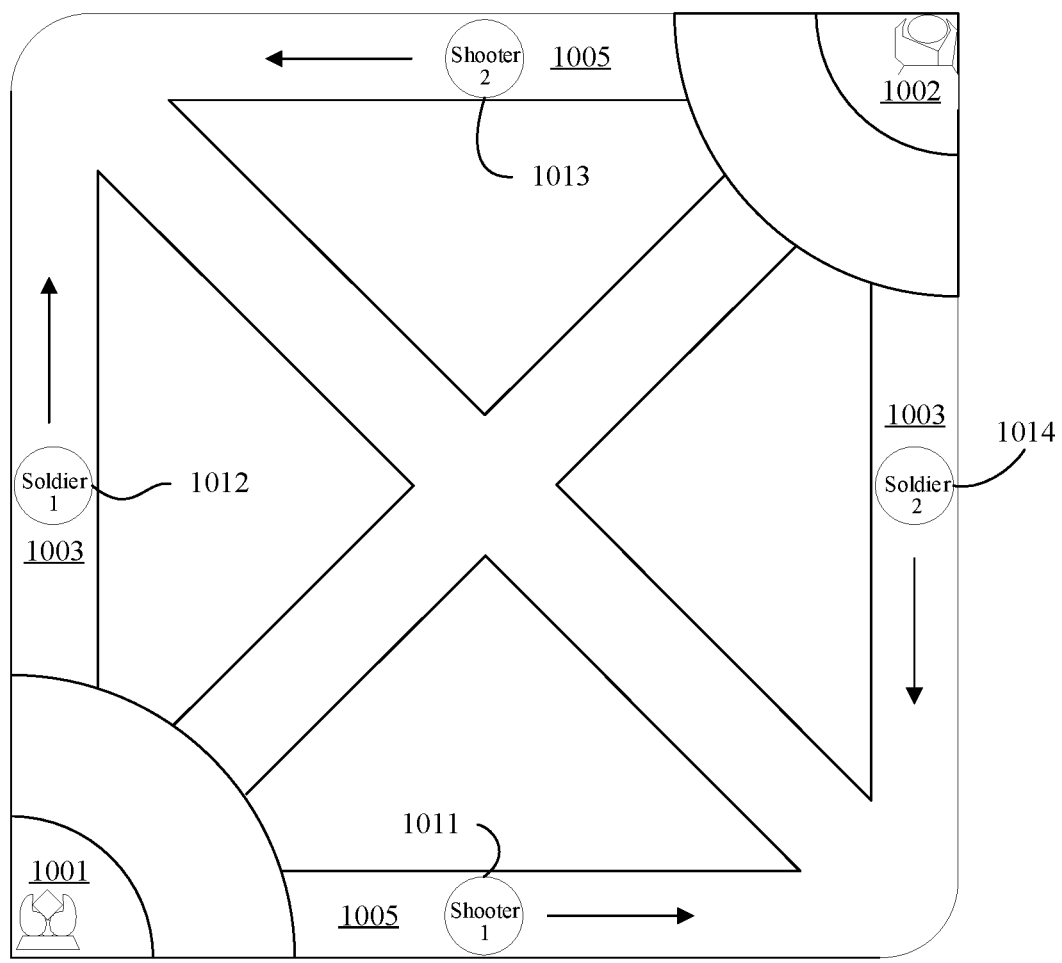
FIG. 6 is a schematic diagram of a virtual scene according to another exemplary embodiment of this application.

For example, as shown in FIG. 6, a first shooter 1011 of a blue party attacks a red party from a lower route 1005 of the blue party, a first soldier 1012 of the blue party attacks the red party from an upper route 1003 of the blue party, a second shooter 1013 of the red party initiates an attack on the blue party from a lower route 1005 of the red party, and a second soldier 1014 of the red party initiates an attack on the blue party from an upper route 1003 of the red party. That is, the first shooter 1011 fights against the second soldier 1014, and the first soldier 1012 fights against the second shooter 1013.

Figure 7:
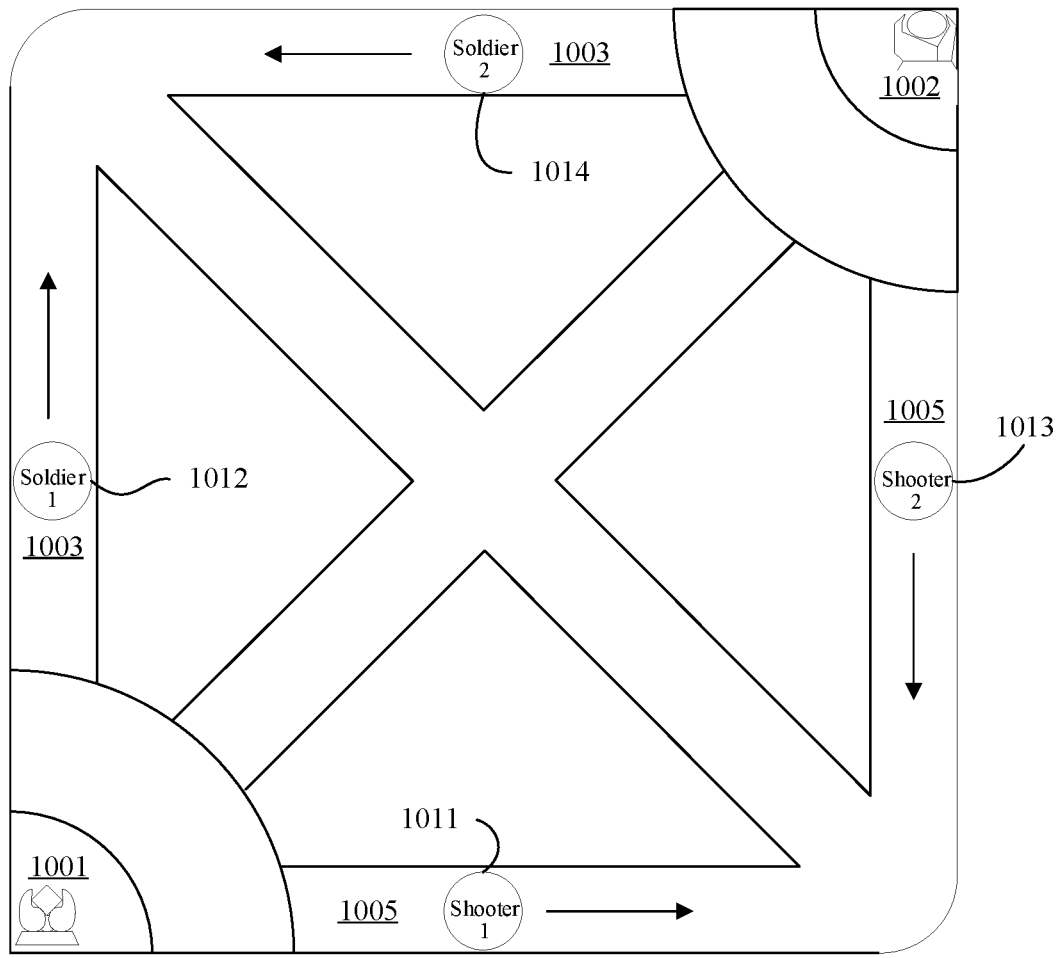
FIG. 7 is a schematic diagram of a virtual scene according to another exemplary embodiment of this application.

However, to make a game fairer, a more proper fighting manner is shown in FIG. 7, where the first shooter 1011 of the blue party fights against the second shooter 1013 of the red party, and the first soldier 1012 of the blue party fights against the second soldier 1014 of the red party. To implement such a fighting manner, a problem of how to cause the lower route of the blue party and the lower route of the red party to be a same route needs to be resolved. That is, the upper and lower routes of one of the blue party or the red party are exchanged, so that the original lower route is changed to the upper route, and the original upper route is changed to the lower route. For example, the upper and lower routes of the red party are changed to be in locations of the upper route 1003 and the lower route 1005 shown in FIG. 7. The lower route 1005 of the blue party is also the lower route 1005 of the red party, and the upper route 1003 of the blue party is also the upper route 1003 of the red party.

Second Typical MOBA Game.

The second typical MOBA game mode and the first typical MOBA game are the same in game playing method. The virtual scene is similarly in the shape of a square, bases of the first camp and the second camp are similarly located on a diagonal line of the square, and five virtual characters of each camp similarly initiate attacks on a hostile along three attack directions separately. The difference is that, the lower route of the first camp is also the lower route of the second camp, and the upper route of the first camp is also the upper route of the second camp. The second typical MOBA game implements this more proper fighting manner by using the following method.

Figure 8:
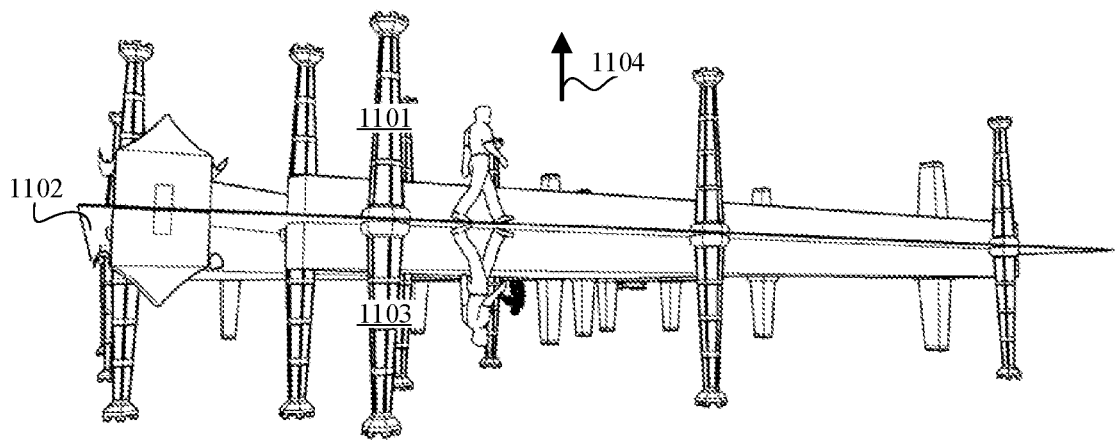
FIG. 8 is a schematic diagram of a mirrored virtual scene of another typical MOBA game according to another exemplary embodiment of this application.
Figure 9:
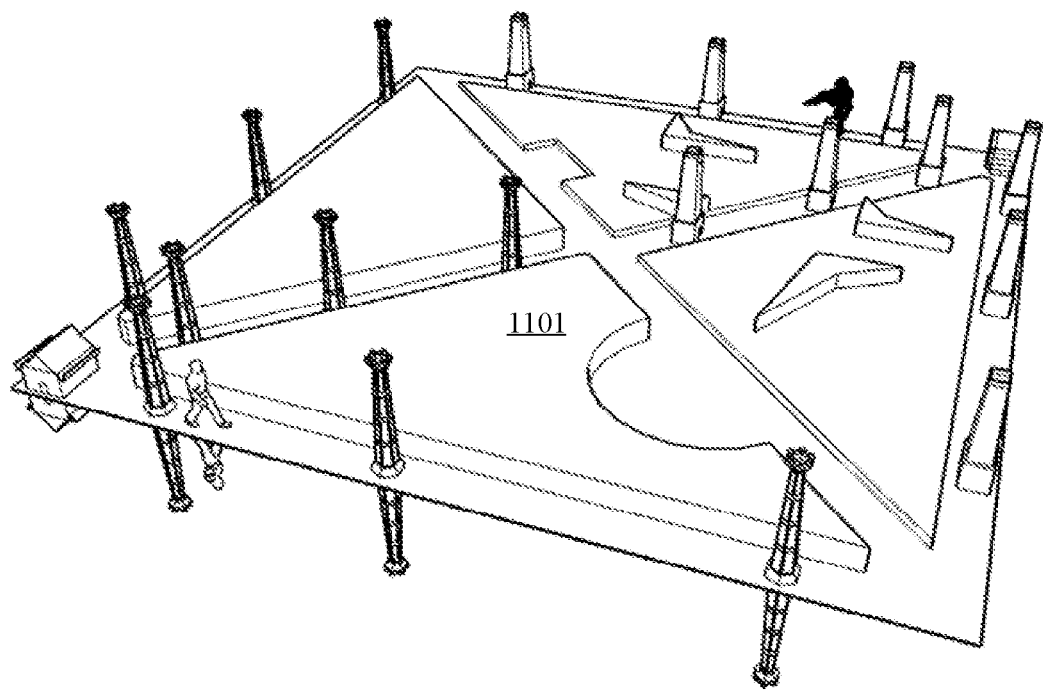
FIG. 9 is a schematic diagram of a mirrored virtual scene of another typical MOBA game according to another exemplary embodiment of this application.
Figure 10:
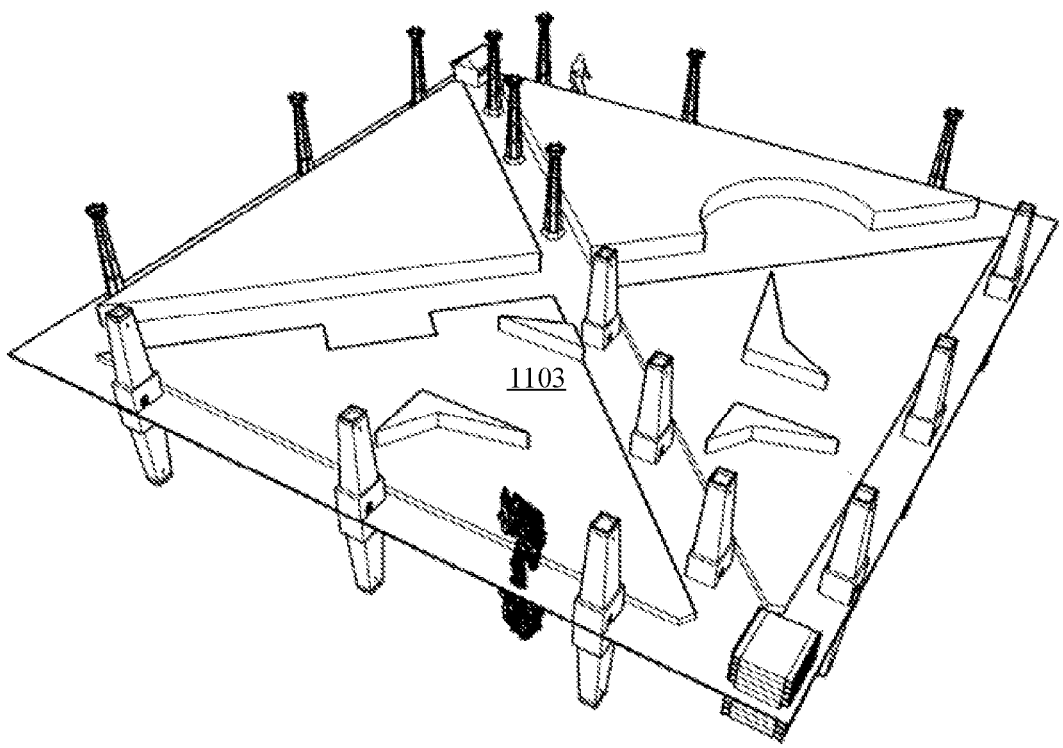
FIG. 10 is a schematic diagram of a mirrored virtual scene of another typical MOBA game according to another exemplary embodiment of this application.

First, there is a first virtual scene, and then a second virtual scene is mirrored from the first virtual scene about a horizon. As shown in FIG. 8, there are a first virtual scene 1101, and a second virtual scene 1103 symmetric with the first virtual scene 1101 about a horizon 1102, that is, the second virtual scene is a mirrored reflection of the first virtual scene.

The following describes a system architecture related to this application.

Figure 11:
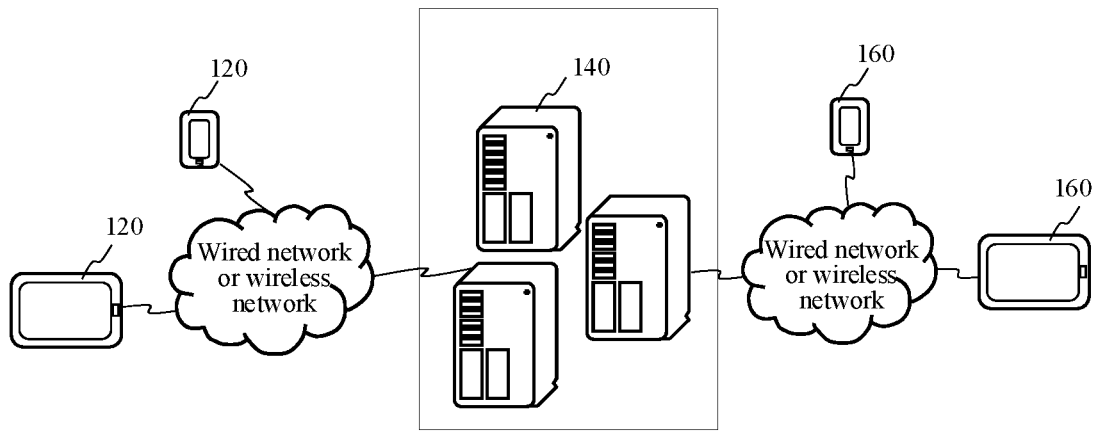
FIG. 11 is a schematic diagram of an implementation environment of a method for displaying a virtual resource according to an embodiment of this application.

FIG. 11 is a schematic diagram of an implementation environment of a method for displaying a virtual resource according to an embodiment of this application. Referring to FIG. 11, the implementation environment includes: a first terminal 120, a server 140, and a second terminal 160.

An application supporting a virtual scene is installed and run on the first terminal 120. The application is any one of a MOBA game, a massively multiplayer online role playing game (MMORPG), a first-person shooting (FPS) game, a third-person shooting game, a virtual reality application, a three-dimensional map program, a military simulation program, or a multiplayer gunfight survival game. The first terminal 120 is a terminal used by a first user. The first user uses the first terminal 120 to operate a virtual object A located in the virtual scene to perform activities.

The server 140 may include at least one of one server, a plurality of servers, a cloud computing platform, and a virtualization center. The server 140 is configured to provide a backend service for an application supporting a virtual scene. In some embodiments, the server 140 may be responsible for primary computing work, and the first terminal 120 and the second terminal 160 may be responsible for secondary computing work; or the server 140 is responsible for secondary computing work, and the first terminal 120 and the second terminal 160 are responsible for primary computing work; or the server 140, the first terminal 120 and the second terminal 160 perform collaborative computing by using a distributed computing architecture among each other.

An application supporting a virtual scene is installed and run on the second terminal 160. The application is any one of a MOBA game, an MMORPG, an FPS game, a third-person shooting game, a virtual reality application, a three-dimensional map program, a military simulation program, or a multiplayer gunfight survival game. The second terminal 160 is a terminal used by a second user. The second user uses the second terminal 160 to operate a virtual object B located in the virtual scene to perform activities.

The first terminal 120 and the second terminal 160 may be directly or indirectly connected to the server 140 in a wired or wireless communication manner. The connection manner is not limited in the embodiments of this application.

In some embodiments, the virtual object A controlled by the first terminal 120 and the virtual object B controlled by the second terminal 160 are located in the same virtual scene, and in this case, the virtual object A may interact with the virtual object B in the virtual scene. The virtual object A and the virtual object B may be in an opposing relationship, for example, the virtual object A and the virtual object B may belong to different teams and camps. The virtual objects in the opposing relationship may battle against each other by casting virtual skills, for example, the virtual object A casts an attack skill to the virtual object B. In some other embodiments, the virtual object A and the virtual object B may be teammates, for example, the virtual object A and the virtual object B may belong to the same camp, the same team, or the same organization, and have a friend relationship with each other or have a temporary communication permission. In this case, the virtual object A may cast an auxiliary skill to the virtual object B.

The server 140 is an independent physical server, or is a server cluster or a distributed system formed by a plurality of physical servers, or is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

The first terminal 120 or the second terminal 160 is a smartphone, a smart handheld game console, a portable game device, a tablet computer, a notebook computer, a desktop computer, a smartwatch, or the like, but is not limited thereto.

The applications installed on the first terminal 120 and the second terminal 160 are the same, or the applications installed on the two terminals are the same type of applications on different operating system platforms. The first terminal 120 may be generally one of a plurality of terminals, and the second terminal 160 may be generally one of a plurality of terminals. In this embodiment, only the first terminal 120 and the second terminal 160 are used as examples for description. The device types of the first terminal 120 and the second terminal 160 may be the same or different. A person skilled in the art may learn that there may be more or fewer terminals. For example, there may be only one terminal, or there may be dozens of or hundreds of or more terminals. The quantity and the device type of the terminals are not limited in the embodiments of this application.

Figure 12:
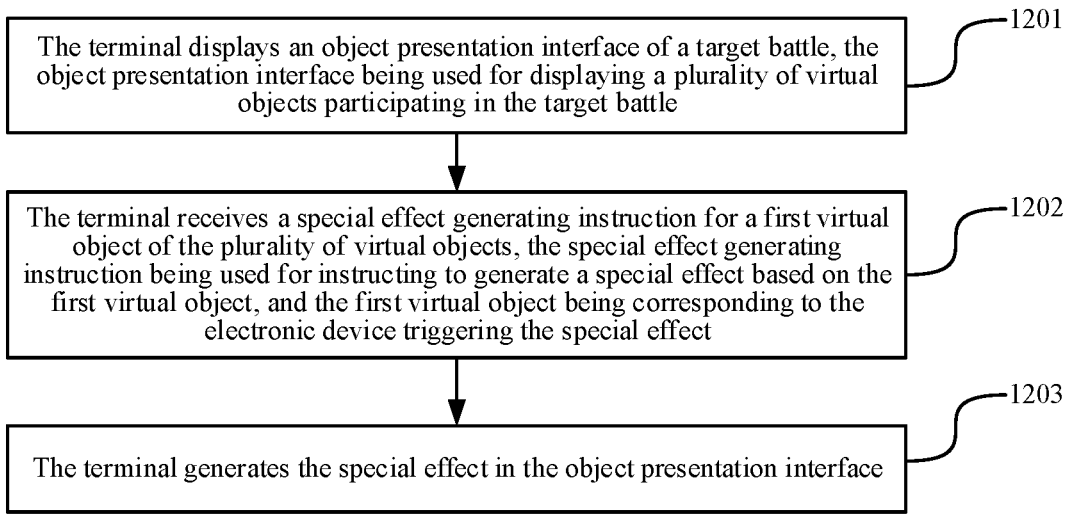
FIG. 12 is a flowchart of a method for generating a special effect in a virtual environment according to an embodiment of this application.

FIG. 12 is a flowchart of a method for generating a special effect in a virtual environment according to an embodiment of this application. Referring to FIG. 12, this embodiment is applied to an electronic device, description is made by using an example in which the electronic device is a terminal, and the terminal is the first terminal 120 or the second terminal 160 shown in FIG. 11. This embodiment includes the following steps:

1201. The terminal displays an object presentation interface of a target battle of a game when loading a virtual scene corresponding to the target battle, the object presentation interface being used for displaying a plurality of virtual objects participating in the target battle.

The target battle refers to any battle of any game involving participation of a plurality of virtual objects. For example, the game is any one of a MOBA game, an MMORPG, an FPS game, a third-person shooting game, a virtual reality application, a three-dimensional map program, a military simulation program, or a multiplayer gunfight survival game. The battle may be a battle in any arena mode, and different arena modes decide quantities of virtual objects participating in a target battle. For example, the arena modes are 2V2, 3V3, and 5V5, and quantities of virtual objects participating in the target battle are 4, 6, and 10 correspondingly. In some embodiments, each of the plurality of virtual objects corresponds to an electronic device. That is, each virtual object corresponds to a terminal, and different virtual objects correspond to different terminals.

The plurality of virtual objects refer to some or all virtual objects participating in the target battle. Correspondingly, all virtual objects participating in the target battle are displayed in the object presentation interface, so that a user can recognize the participating objects of the entire battle more clearly. In some embodiments, only virtual objects participating in the target battle and belonging to the same camp (or the same team) as that to which a virtual object corresponding to the current terminal belongs are displayed in the object presentation interface, so that virtual objects in the current camp can establish a friendlier social networking interaction relationship through the method for generating a special effect in a virtual environment provided in this embodiment of this application.

For example, in a MOBA game in the 5V5 mode, the total of all virtual objects participating in the target battle is 10. Among the 10 virtual objects, 5 virtual objects belong to the first camp, and the other 5 virtual objects belong to the second camp. In some embodiments, all 10 virtual objects participating in the target battle are displayed in the object presentation interface, so that the user corresponding to the terminal can take a panoramic view of the entire battle in the object presentation interface. In some embodiments, when the virtual object corresponding to the current terminal belongs to the first camp, only 5 virtual objects participating in the target battle and belonging to the first camp can be alternatively displayed in the object presentation interface, so that the user corresponding to the terminal can perform social networking interaction with another ally of the current camp conveniently and quickly.

In some embodiments, in response to a starting operation on an application, the terminal starts the application, where the starting operation is a touch operation performed by the user on an icon of the application on the desktop of the terminal, or a starting instruction for the application entered by the user into an intelligent voice assistant, the starting instruction includes a voice instruction or a text instruction, and this is not limited in this embodiment of this application. In some embodiments, the application is a game application, or a game embedded program (for example, "game mini-program") in another application, and the type of the application is not limited in this embodiment of this application.

In some embodiments, when the user sets an automatic starting condition for the application, in response to detecting that the automatic starting condition of the application is met, the operating system of the terminal automatically starts the application. In some embodiments, the automatic starting condition is to periodically start the application such as start the application at 8 o'clock in the evening every day, or the automatic starting condition is to automatically start during startup, and the automatic starting condition of the application is not limited in this embodiment of this application.

In the foregoing process, the terminal starts the application, a battle start configuration interface is displayed in the application, and the battle start configuration interface includes a switching control of a special effect contest function, an arena mode selecting control, an account setting control, a virtual object selecting control, a virtual scene (scene map) selecting control, a battle start option, and the like.

The special effect contest function refers to a special effect active triggering function provided based on a special effect display manner provided in this embodiment of this application. In some embodiments, when the special effect contest function is enabled, in a process that the terminal loads a virtual scene after battle start, a special effect triggering option is provided in the object presentation interface, so that the user can actively request to trigger the special effect through a triggering operation on the triggering option, that is, initiate a special effect "contest" behavior. When a plurality of terminals "contest" the special effect, a server makes a decision on which terminal triggers the special effect successfully, the server transmits, after making the decision, the special effect generating instruction to the terminals in the target battle, and the terminals generate, based on the first virtual object corresponding to the terminal finally triggering the special effect, the special effect according to the special effect generating instruction transmitted by the server. When the first virtual object is a virtual object corresponding to the current terminal, it indicates that the current terminal triggers the special effect successfully. In this case, the triggering option of the special effect is set to an inactive state, and the user is not allowed to repeatedly trigger a new round of special effect during special effect display. When the first virtual object is not a virtual object corresponding to the current terminal, it indicates that the current terminal triggers the special effect unsuccessfully. In this case, the current terminal cancels display of the triggering option of the special effect, and displays a social networking interaction option in an original location, so that the user corresponding to the terminal can trigger, through the social networking interaction option at any time, to perform interaction with the special effect of the first virtual object. For example, the social networking interaction option is a like giving option.

In some embodiments, when the special effect contest function is disabled, it indicates that the user corresponding to the terminal does not intend to actively trigger the special effect, and in a process that the terminal loads a virtual scene after battle start, a special effect triggering option is not provided in the object presentation interface. When another terminal participating in the target battle triggers the special effect, the server transmits the special effect generating instruction to all the terminals participating in the target battle and including the current terminal, so that after receiving the special effect generating instruction, the terminals generate the special effect based on the first virtual object corresponding to the terminal finally triggering the special effect. The current terminal disables the special effect contest function in this case. Therefore, it can be learned that the first virtual object definitely does not include the virtual object corresponding to the current terminal, and then the current terminal can provide a social networking interaction option of the special effect in the object presentation interface, so that the user corresponding to the terminal can trigger, through the social networking interaction option at any time, to perform interaction with the special effect of the first virtual object. For example, the social networking interaction option is a like giving option.

In some embodiments, the user sets, based on the switching control of the special effect contest function, whether to enable the special effect contest function, which decides whether to display the triggering option of the special effect on the object presentation interface. In some embodiments, the user can further select, based on the arena mode selecting control, an arena mode of the target battle in which the user participates this time. For example, the arena mode includes 2V2, 3V3, and 5V5. In some embodiments, the user can further select, based on the virtual scene selecting control, a virtual scene of the target battle in which the user participates this time (that is, a fighting scene map). In some embodiments, the user can further select, based on the virtual object selecting control, a virtual object that fights in the target battle this time.

Some target battles support the user in customizing and selecting a virtual scene. Some target battles may alternatively not support the user in customizing and selecting a virtual scene. In this case, only a virtual scene bound to the arena mode can be loaded, or the server randomly selects a virtual scene from a plurality of virtual scenes bound to the arena mode as a virtual scene of a target battle. Whether a virtual scene can be autonomously selected is not limited in this embodiment of this application.

When being selected, a virtual object needs to be selected from virtual objects that have been activated by the user (that is, whose use permission is owned by the user), that is, some virtual objects that have not been activated by the user (that is, whose use permission is not owned by the user) cannot be selected as virtual objects fighting in the target battle. In some implementations, use permission of some virtual objects may be granted to the user provisionally based on some virtual props (for example, a limited-time free card), so that the user can experience playing methods and hand feelings of the some virtual objects. In this case, even if the user has not activated a virtual object, the user can still select the virtual object as a virtual object fighting in the target battle.

In some embodiments, when setting whether to enable the special effect contest function, select the arena mode, select the virtual scene, and select the virtual object, the user takes a selecting operation including but not limited to: a click/tap operation, a long press operation, a double-click operation, a voice instruction, a triggering operation based on a shortcut key, and the like.

In some embodiments, after completing configuration on the special effect contest function, the arena mode, and the virtual scene, the user may trigger, through the triggering operation on the battle start option, the terminal to start the target battle. In this case, the virtual scene usually requires relatively enormous display resources, and three-dimensional models of the virtual objects need to be launched into the virtual scene. Therefore, after the target battle is started, there is usually a process of loading the virtual scene. To prevent the user from boringly waiting for the loading process, the terminal may display the object presentation interface in the process of loading the virtual scene.

In the foregoing process, the terminal loads a virtual scene corresponding to the target battle in response to a battle start operation of the user on the target battle, and displays the object presentation interface during loading of the virtual scene. The object presentation interface may be also referred to as a virtual scene loading interface, an image passing interface, a battle start wait interface, a virtual scene initialization interface, and the like. In some embodiments, in the object presentation interface, a plurality of virtual objects participating in the target battle are displayed, and an innovative social networking interaction manner based on the triggering option and the social networking interaction option of special effects is provided, so that efficient social contact may be achieved between users.

In some embodiments, when virtual objects are displayed in the object presentation interface, identity pictures of the virtual objects may be displayed, the identity pictures are portraits, portraitures, full-body standing drawings, half-length portraits, full-length portraits, and the like of the virtual objects, and can identify unique identities of the virtual objects. The identity pictures require relatively little loading display resources, and therefore computing resources of the terminal can be saved.

In some embodiments, when virtual objects are displayed in the object presentation interface, three-dimensional (3D) models of the virtual objects are displayed. In this case, on the virtual objects can be presented more intuitively and three-dimensionally, so that when a special effect is generated based on the first virtual object subsequently, a better visual effect with higher visualization can be achieved.

In some embodiments, when the identity pictures or 3D models of the foregoing virtual objects are displayed, the terminal can determine, according to skins currently worn by the virtual objects, identity pictures or 3D models corresponding to the skins to be displayed, thereby making it convenient for users to customize dressing of the virtual objects.

1202. The terminal receives a special effect generating instruction for a first virtual object of the plurality of virtual objects, the special effect generating instruction being used for instructing to generate a special effect based on the first virtual object, and the first virtual object being corresponding to a user of the electronic device triggering the special effect.

In some embodiments, the special effect generating instruction being used for instructing to generate a special effect based on the first virtual object means that the special effect generating instruction is used for instructing to determine a generating location of the special effect based on the first virtual object and generate the special effect in the generating location; or the special effect generating instruction being used for instructing to generate a special effect based on the first virtual object means that the special effect generating instruction is used for instructing to determine the special effect corresponding to the first virtual object and generate the special effect corresponding to the first virtual object, where the special effect corresponding to the first virtual object refers to a special effect belonging to a special effect type corresponding to the first virtual object or refers to a special effect bound to the first virtual object. This is not limited in this embodiment of this application.

In some embodiments, regardless of whether the terminal has enabled the special effect contest function, once any terminal participating in the target battle triggers the special effect, the server transmits the special effect generating instruction to all the terminals participating in the target battle, and all the terminals receive the special effect generating instruction. A triggering manner of the special effect is described in a next embodiment by using an example in which the current terminal enables the special effect contest function, and details are not described in this embodiment.

In some embodiments, the special effect generating instruction carries an identifier (ID) of the first virtual object triggering a special effect, an effect ID of the special effect, and a display moment of the special effect (that is, a count start point). In some embodiments, the special effect generating instruction further carries a target duration for which the special effect is continuously displayed, and the target duration is any value greater than 0.

the first virtual object may include the virtual object corresponding to the terminal, indicating that the terminal successfully triggers the special effect in the current round, or the first virtual object may not include the virtual object corresponding to the terminal, indicating that the terminal does not successfully trigger the special effect in the current round.

In some embodiments, there are one or more first virtual objects, that is, only one virtual object is allowed to contest a special effect triggering right in each round of contesting a special effect, and in this case the special effect generating instruction includes an ID of only one first virtual object; a plurality of virtual objects are allowed to contest a special effect triggering right in each round of contesting a special effect, and in this case the special effect generating instruction may include IDs of a plurality of first virtual objects. The quantity of first virtual objects is not limited in this embodiment of this application.

In some embodiments, after receiving any instruction transmitted by the server, the terminal parses a target field (for example, header field) of the any instruction, determines, when the target field carries a special effect display identifier, the any instruction as the special effect generating instruction, and parses other fields (for example, data field) of the special effect generating instruction, to obtain the ID of the first virtual object, the effect ID of the special effect, and the display moment of the special effect.

In some embodiments, the special effect display identifier is an instruction type ID used for identifying the special effect generating instruction. In this case, the instruction type ID is encapsulated in the target field of the special effect generating instruction, and the ID of the first virtual object, the effect ID of the special effect, and the display moment of the special effect are encapsulated in other fields. In this case, data transmission accuracy can be ensured.

In some other embodiments, the special effect display identifier is an effect ID of the special effect. In this case, the effect ID of the special effect is encapsulated in the target field of the special effect generating instruction, and the ID of the first virtual object and the display moment of the special effect are encapsulated in other fields. In this case, overheads of communication between the terminal and the server can be saved.

In some embodiments, the special effect generating instruction received by the terminal is compressed and encrypted, the terminal may recognize an encryption algorithm and a compression algorithm, decrypt and decompress the special effect generating instruction based on corresponding decryption and decompression algorithms, and parse the decrypted and decompressed special effect generating instruction.

1203. The terminal generates the special effect identifying the first virtual object in the object presentation interface.

In some embodiments, the terminal determines a generating location and a generating time of the special effect and a special effect file corresponding to the special effect based on the special effect generating instruction, where the generating location of the special effect is a location corresponding to the first virtual object. The terminal generates the special effect in the object presentation interface based on the generating location and the generating time of the special effect and the special effect file corresponding to the special effect. In some embodiments, the special effect file corresponding to the special effect is a file made in advance, and by invoking the special effect file, the terminal can generate the corresponding special effect in the interface.

For example, the terminal determines a generating location and a generating time of the special effect and a special effect file corresponding to the special effect based on the special effect generating instruction. The terminal determines a rendering parameter of the special effect based on the file corresponding to the special effect and the generating location of the special effect. The terminal performs rendering in the object presentation interface based on the rendering parameter, to generate the special effect.

In some embodiments, the special effect generating instruction carries an ID of the first virtual object triggering a special effect, an effect ID of the special effect, and a generating moment of the special effect (that is, a count start point). The terminal obtains the ID of the first virtual object triggering a special effect, the effect ID of the special effect, and the generating moment of the special effect from the special effect generating instruction. The terminal loads a special effect file corresponding to the effect ID based on the effect ID of the special effect. The terminal determines a generating location of the special effect in the object presentation interface based on the ID of the first virtual object. The terminal determines a rendering parameter of the special effect based on the file corresponding to the special effect and the generating location of the special effect. In response to reaching the generating moment of the special effect, the terminal performs rendering in the object presentation interface based on the rendering parameter, to generate the special effect.

The generating location of the special effect in the object presentation interface is a location corresponding to the first virtual object in the object presentation interface. In some embodiments, the terminal indicates the generating location in the form of coordinates. When virtual objects are displayed in the object presentation interface in the form of identity pictures, the generating location is on an identity picture corresponding to the first virtual object. Correspondingly, when determining the generating location, the terminal determines a location on the identity picture corresponding to the first virtual object in the object presentation interface based on the ID of the first virtual object. When virtual objects are displayed in the object presentation interface in the form of 3D models, the generating location is on a 3D model corresponding to the first virtual object. Correspondingly, when determining the generating location, the terminal determines a location on the 3D model corresponding to the first virtual object in the object presentation interface based on the ID of the first virtual object. When virtual objects are displayed in the object presentation interface in the form of avatars, the generating location is on an avatar corresponding to the first virtual object. Correspondingly, when determining the generating location, the terminal determines a location on the avatar corresponding to the first virtual object in the object presentation interface based on the ID of the first virtual object. Alternatively, the generating location is determined by a technician when the object presentation interface is displayed. This is not limited in this embodiment of this application.

In some embodiments, the terminal generates the special effect in a display region corresponding to the first virtual object in the object presentation interface. In some embodiments, the generating the special effect in the object presentation interface refers to displaying the special effect in the object presentation interface.

In some embodiments, when virtual objects are displayed in the object presentation interface in the form of identity pictures, the display region corresponding to the first virtual object refers to an identity picture of the first virtual object. In some embodiments, the display region corresponding to the first virtual object is also a designated region that is specially used for displaying the special effect in the object presentation interface, or the display region corresponding to the first virtual object is a full screen. This is not limited in this embodiment of this application.

In some embodiments, when virtual objects are displayed in the object presentation interface in the form of 3D models, the display region corresponding to the first virtual object refers to a three-dimensional space centered on the first virtual object. For example, the three-dimensional space is a cubic space or spherical space. The shape of the three-dimensional space is not limited in this embodiment of this application, and the three-dimensional space is similar to a collision detection box of the first virtual object, and refers to a three-dimensional space within a target range around the first virtual object. In some embodiments, the display region corresponding to the first virtual object is a designated 3D space that is specially used for displaying the special effect in the object presentation interface, or the display region corresponding to the first virtual object is a full screen. This is not limited in this embodiment of this application.

In some embodiments, the special effect is divided into a first special effect and a second special effect. The first special effect is a special effect of the first virtual object, that is to say, the first special effect refers to an individual special effect of the first virtual object. The second special effect is a special effect of a camp to which the first virtual object belongs, that is to say, the second special effect refers to a team special effect of the camp to which the first virtual object belongs.

In some embodiments, if description is made by using an example in which virtual objects are displayed in the object presentation interface in the form of identity pictures, the terminal may generate the first special effect on an identity picture of the first virtual object in the object presentation interface. In this implementation, the terminal can display the special effect on the identity picture of the first virtual object, so that other terminals participating in the target battle can clearly learn that the terminal corresponding to the first virtual object triggers the special effect, and man-machine interaction efficiency is relatively high. In some embodiments, the terminal determines a second virtual object from the plurality of virtual objects, where the second virtual object and the first virtual object belong to the same camp; and generates the second special effect in a background region in which identity pictures of the first virtual object and the second virtual object are located. For example, the first special effect is to display a "converged" lighting effect on a half-length portrait of the first virtual object, the second special effect is to display a ribbon lighting effect similar to "galaxy" on a background region of virtual objects belonging to the camp, and the first special effect and the second special effect may be collectively referred to as a "backdrop" special effect.

In some embodiments, if description is made by using an example in which virtual objects are displayed in the object presentation interface in the form of 3D models, the terminal may generate the first special effect in a three-dimensional space centered on a 3D model of the first virtual object in the object presentation interface. In some embodiments, the terminal determines a second virtual object from the plurality of virtual objects, where the second virtual object and the first virtual object belong to the same camp; and generates the second special effect in a background space formed by communication between 3D models of the first virtual object and the second virtual object. For example, the first special effect is to display a "converged" 3D lighting effect around the 3D model of the first virtual object, the second special effect is to display a 3D ribbon lighting effect similar to "galaxy" on a background space formed by communication between the 3D models of virtual objects belonging to the camp, and the first special effect and the second special effect may be collectively referred to as a "backdrop" special effect.

In the foregoing process, besides displaying the first special effect to the first virtual object corresponding to the terminal triggering the special effect, the second special effect of the team is further displayed to second virtual objects in the camp to which the first virtual object belongs, thereby achieving a richer interaction effect, so that the process of contesting the special effect triggering right is more competitive and interesting.

In some other embodiments, the special effect includes only the first special effect but does not include the second special effect, and in this case, the display region corresponding to the first virtual object refers to the identity picture of the first virtual object, or refers to the three-dimensional space around the 3D model; or the special effect includes only the second special effect but does not include the first special effect, and in this case, the display region corresponding to the first virtual object refers to only the background region in which identity pictures of the first virtual object and the second virtual object are located, or refers to the background space formed by communication between 3D models of the first virtual object and the second virtual object.

In some embodiments, a representation form of the special effect includes but not limited to any one or a combination of at least two of the following: picture, video, GIF image, animation, dynamic effect, sound effect, sticker, magic expression, magic special effect, Flash, virtual reality (VR) special effect, augmented reality (AR) special effect, and the like. In some embodiments, when virtual objects are displayed by using 3D models in the object presentation interface, the first virtual object triggering the special effect may use a lighting special effect, to create an effect of performing lighting around the 3D model of the first virtual object, which is similar to performing spotlight on the first virtual object on a stage, to highlight that the first virtual object grabs the special effect in the current round, thereby achieving a more visual interaction effect.

In some embodiments, when generating the special effect, for a special effect of the type such as dynamic effect, sticker, or magic expression, the terminal searches, based on the effect ID of the special effect carried in the special effect generating instruction, for a special effect resource corresponding to the effect ID from a local cache or magnetic disk, and renders the special effect resource by using a graphics processing unit (GPU), to generate the special effect in the display region at the time of reaching the display moment of the special effect. When the special effect includes the first special effect and the second special effect, it is only necessary to find respective special effect resources of the first special effect and the second special effect separately and render the respective special effect resources, to display the first special effect and the second special effect in respective corresponding display regions.

In some embodiments, when generating the special effect, for a special effect of the type such as animation, Flash, or video, the terminal searches, based on the effect ID of the special effect carried in the special effect generating instruction, for a special effect resource corresponding to the effect ID from a local cache or magnetic disk, and plays the special effect resource by invoking a play control, thereby generating the special effect in the display region. When the special effect includes the first special effect and the second special effect, it is only necessary to find respective special effect resources of the first special effect and the second special effect separately and play the respective special effect resources by invoking different play controls, to display the first special effect and the second special effect in respective corresponding display regions.

In the foregoing process, only a case that the first terminal loads the special effect resource corresponding to the special effect in the cache or magnetic disk is used as an example for description. In some embodiments, when the first terminal does not pre-store the special effect resource corresponding to the special effect locally, the first terminal obtains the special effect resource corresponding to the special effect, and then displays the special effect based on the special effect resource. In some embodiments, the special effect resource corresponding to the special effect is carried in the special effect generating instruction; or the special effect resource corresponding to the special effect is not carried in the special effect generating instruction, and instead it is necessary for the terminal to transmit a special effect resource request to the server again, to request the server to return the special effect resource corresponding to the special effect. A manner of obtaining the special effect resource is not limited in this embodiment of this application.

In some embodiments, for the purpose of saving display resources, more display resources are wasted if the special effect is always continuously being displayed. Therefore, a target duration for continuous display may be set for the special effect, and the special effect is cyclically played in the target duration. Once the target duration is exceeded, the special effect is not displayed, and a new round of special effect contest is started. The object presentation interface is displayed only after loading of the virtual scene is completed, and the current round of game is started by entering the virtual scene of the target battle.

In some embodiments, the target duration is a display parameter pre-stored by the terminal locally, that is, regardless of which battle is in process, the special effect is continuously being displayed for the target duration at most; or the target duration is carried in the special effect generating instruction, so that the server may designate a same or different target duration for a special effect triggered each time, and therefore the target duration for which the special effect is continuously being displayed can be dynamically adjusted.

In some embodiments, because the special effect generating instruction further carries the display moment of the special effect, a count control of the special effect may be further displayed in the object presentation interface, where the count control of the special effect is used for recording a display duration of the special effect. The displaying the count control in the presentation interface can remind the user of the display duration of the special effect, making it convenient for the user to participate in special effect contest again after display of the special effect is completed. In some embodiments, the count control of the special effect is a countdown control, the countdown control takes the display moment as a countdown start point, and takes the target duration as an entire countdown duration. When the countdown reaches 0, the countdown is stopped and the special effect is not displayed. In some embodiments, the count control of the special effect is a count control taking the display moment as a count start point. When the target duration is reached, the count is stopped and the special effect is not displayed. In some embodiments, the count control (including the countdown control or count control) is a count stopwatch, a count progress bar, a count icon, or the like.

Figure 13:
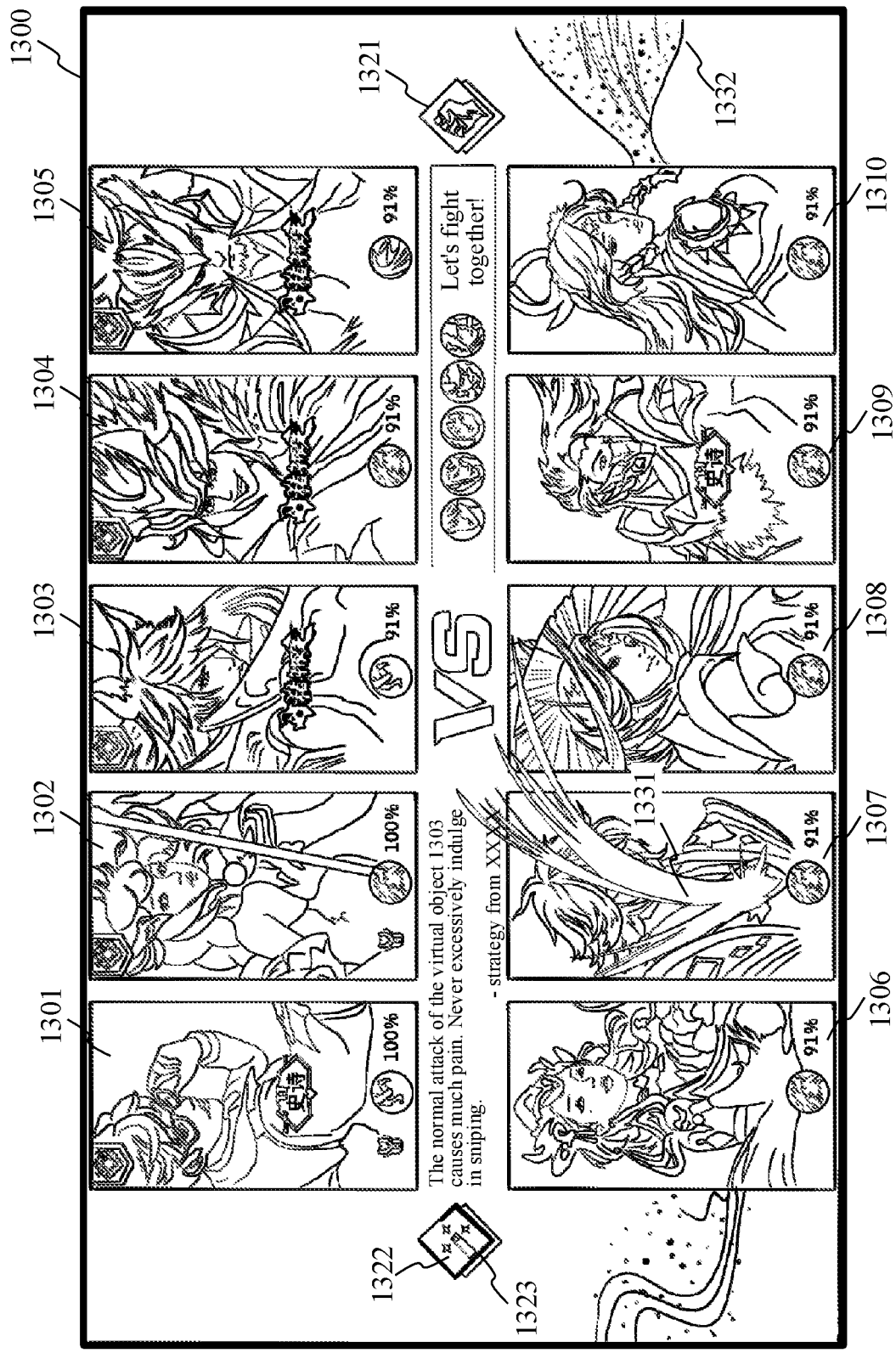
FIG. 13 is a schematic diagram of an object presentation interface for generating a special effect according to an embodiment of this application.

FIG. 13 is a schematic diagram of an object presentation interface for generating a special effect according to an embodiment of this application. Referring to FIG. 13, identity pictures of 10 virtual objects 1301 to 1310 are displayed in the object presentation interface 1300, where an upper row of 5 virtual objects 1301 to 1305 belongs to a first camp, a lower row of 5 virtual objects 1306 to 1310 belongs to a second camp, and a virtual object corresponding to the current terminal is a second virtual object 1307 in the lower row. The object presentation interface 1300 further includes an encouragement option 1321 and a triggering option 1322 of a special effect, the encouragement option 1321 is used for cheering and encouraging the current camp, some preset text information used for encouragement is display in the object presentation interface 1300 after clicking/tapping the encouragement option 1321, the triggering option 1322 is used for triggering the special effect (that is, contesting the special effect), and a user triggers the special effect by clicking/tapping the triggering option 1322. When the special effect is triggered successfully, a special effect generating instruction returned by a server carries an ID of the virtual object 1307, so that the terminal displays a first special effect 1331 with a "converged" lighting effect on an identity picture of the virtual object 1307, and further displays a second special effect 1332 similar to "galaxy" and with a ribbon lighting effect on a background region of identity pictures of the virtual objects 1306 to 1310. The current terminal triggers the special effect successfully. Therefore, the triggering option 1322 displayed in the object presentation interface is presented in an inactive state, and the edge of the triggering option 1322 is actually a countdown control 1323. When a target duration is reached, display of the first special effect 1331 and the second special effect 1332 is canceled, and the triggering option 1322 is reset from the inactive state to an active state.

All of the above optional technical solutions can be combined randomly to form optional embodiments of this application. Details are not described herein again.

Based on the method provided in this embodiment of this application, a corresponding special effect is displayed based on the first virtual object corresponding to the terminal triggering the special effect in the object presentation interface of the target battle, so that in a process of presenting virtual objects participating in the target battle, an innovative social networking interaction manner based on a special effect is provided, and a positive game feedback is provided in the object presentation interface, thereby improving the man-machine interaction effect. Further, for the object presentation interface displayed in the virtual scene loading process, a case that the user can perform only boring and tiresome wait is avoided, and in the loading process through which the battle has to pass and to which extremely high attention is paid, virtual objects can be customized and presented and social networking interaction can be performed, thereby greatly improving recreation experience of the user.

In the foregoing embodiment, how does the terminal display the triggered special effect in the object presentation interface is described, and this special effect may be triggered by the current terminal, to display the special effect in the current terminal. Alternatively, the special effect may be triggered by another terminal participating in the target battle, but the special effect still needs to be displayed in the current terminal. In this embodiment of this application, taking an example in which the current terminal participates in a special effect contest process, how does the terminal trigger the special effect is described. The premise of this process is that the user enables the special effect contest function based on the switching control of the special effect contest function in the battle start configuration interface, but whether the special effect is finally triggered (or contested) successfully is comprehensively decided by the server through an algorithm. Details are described below.

Figure 14:
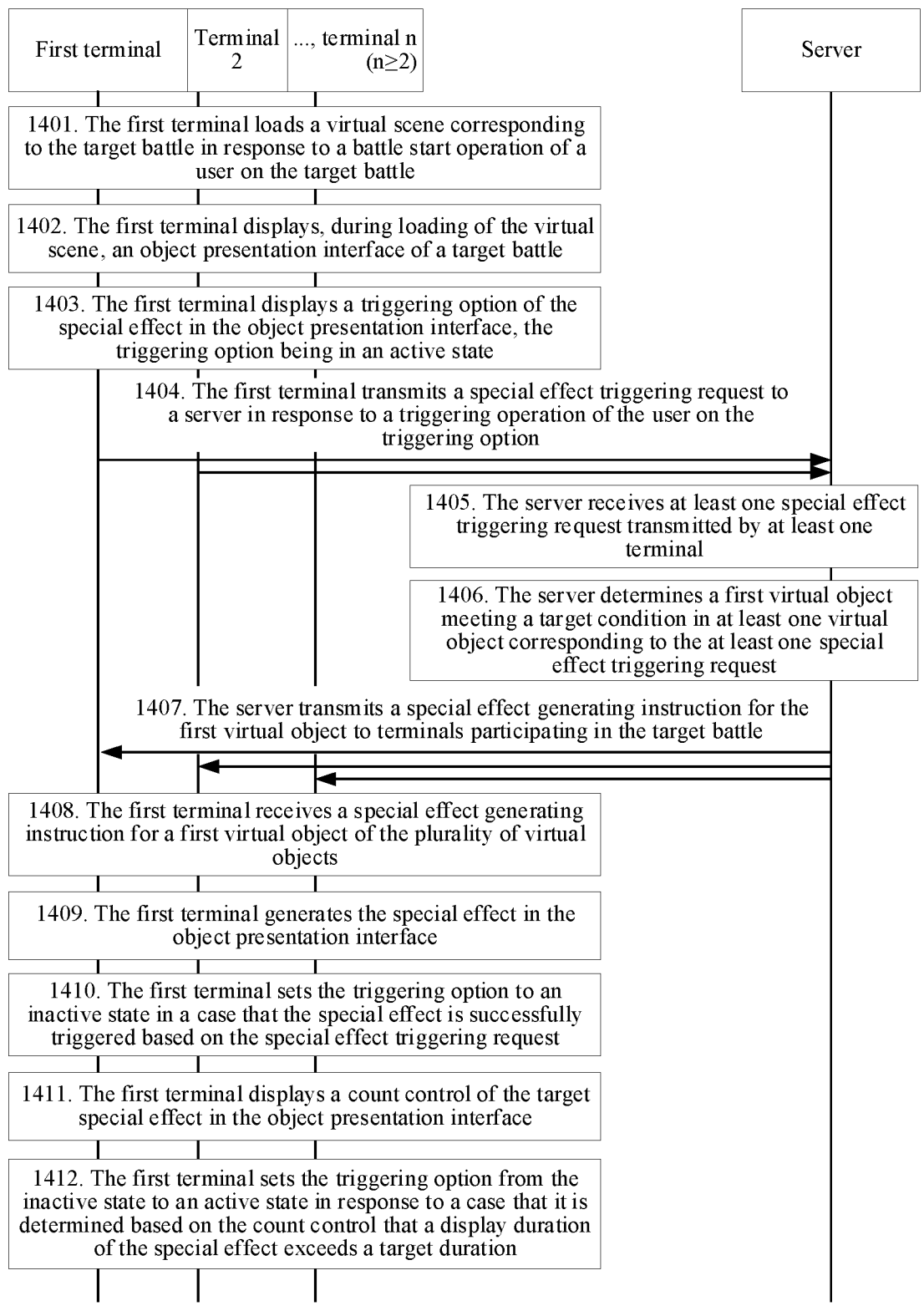
FIG. 14 is an interaction flowchart of a method for generating a special effect in a virtual environment according to an embodiment of this application.

FIG. 14 is an interaction flowchart of a method for generating a special effect in a virtual environment according to an embodiment of this application. Referring to FIG. 14, the embodiment is applied to an interaction process between terminals participating in a target battle and a server, and at least one of the terminals participating in the target battle joins a triggering process for a special effect. In this embodiment of this application, a manner in which any one of the at least one terminal triggers the special effect is described by using a first terminal as an example, a manner in which the server makes a decision to determine a terminal finally triggering the special effect successfully is described, and finally a process of how does the first terminal display the special effect is described. The embodiment includes the following steps:

1401. The first terminal loads a virtual scene corresponding to the target battle in response to a battle start operation of a user on the target battle.

In some embodiments, the first terminal may start, in response to a starting operation of the user on an application, the application, a battle start configuration interface is displayed in the application, and the battle start configuration interface includes a switching control of a special effect contest function, an arena mode selecting control, an account setting control, a virtual object selecting control, a virtual scene (commonly referred to as "scene map") selecting control, a battle start option, and the like.

In this embodiment of this application, description is made by using an example in which the first terminal enables the special effect contest function, that is to say, the user sets, based on the switching control of the special effect contest function, to enable the special effect contest function. Only when the special effect contest function is enabled, the first terminal performs the operation of displaying of the triggering option of the special effect in the following step 1403. When the special effect contest function is disabled, the first terminal does not display the triggering option of the special effect in the object presentation interface.

In some embodiments, when loading the virtual scene, the first terminal may invoke a game rendering engine, render the virtual scene and various virtual resources (for example, stronghold, crystal, and defense tower) in the virtual scene by using a GPU, and also render 3D models of virtual objects participating in the target battle (including virtual objects controlled by a player, and an NPC controlled by a non-player) into the virtual scene. This rendering process needs to consume a relatively large quantity of computing resources. In other words, the virtual scene usually requires relatively enormous display resources, and 3D models of the virtual objects need to be further launched into the virtual scene. Therefore, after the target battle is started, there is usually a process of loading the virtual scene.

1402. The first terminal displays, during loading of the virtual scene, an object presentation interface of a target battle, the object presentation interface being used for displaying a plurality of virtual objects participating in the target battle, and each of the plurality of virtual objects being corresponding to an electronic device.

The object presentation interface may be also referred to as a virtual scene loading interface, an image passing interface, a battle start wait interface, a virtual scene initialization interface, and the like.

In some embodiments, in the object presentation interface, a plurality of virtual objects participating in the target battle are displayed, and an innovative social networking interaction manner based on the triggering option and the social networking interaction option of special effects is provided, so that efficient social contact may be achieved between users. In this embodiment of this application, only how to trigger the special effect through the triggering option is described, and in a next embodiment, how to interact with a displayed special effect through a social networking interaction option is described.

1403. The first terminal displays a triggering option of the special effect in the object presentation interface, the triggering option being in an active state.

In some embodiments, if the user sets the special effect contest function to an enabled state in the battle start configuration interface, the first terminal displays the triggering option of the special effect in the object presentation interface, in other words, the first terminal renders the triggering option of the special effect in the object presentation interface.

In some embodiments, a plurality of layers are rendered in the object presentation interface: a bottom layer is a user interface (UI) layer or 3D layer, in which an entire UI background of the object presentation interface is displayed; a second layer is a team special effect layer, that is, when triggered special effects include a team special effect (that is, the second special effect), the second special effect is displayed in the second layer; a third layer is an identity picture layer of a plurality of virtual objects participating in the target battle, for example, half-length portraits of a plurality of heroes manipulated by a player are displayed in the third layer; and a top layer is an individual special effect layer, that is, when triggered special effects include an individual special effect (that is, the first special effect), the first special effect is displayed in the top layer. In some embodiments, the triggering option of the special effect may be displayed in the top layer, to avoid a case that the triggering option of the special effect is blocked by another button or special effect, making it convenient for the user to interact with the triggering option.

In some embodiments, the foregoing sorting of display levels of the layers is fixed, and therefore computing resources of the first terminal can be saved. In some other embodiments, the foregoing sorting of display levels of the layers is not fixed, and the first terminal may properly and dynamically calculate and set the sorting order of the display levels of the layers, thereby performing flexible control to display the special effect in an upper layer or a lower layer of an identity picture of a virtual object.

Figure 15:
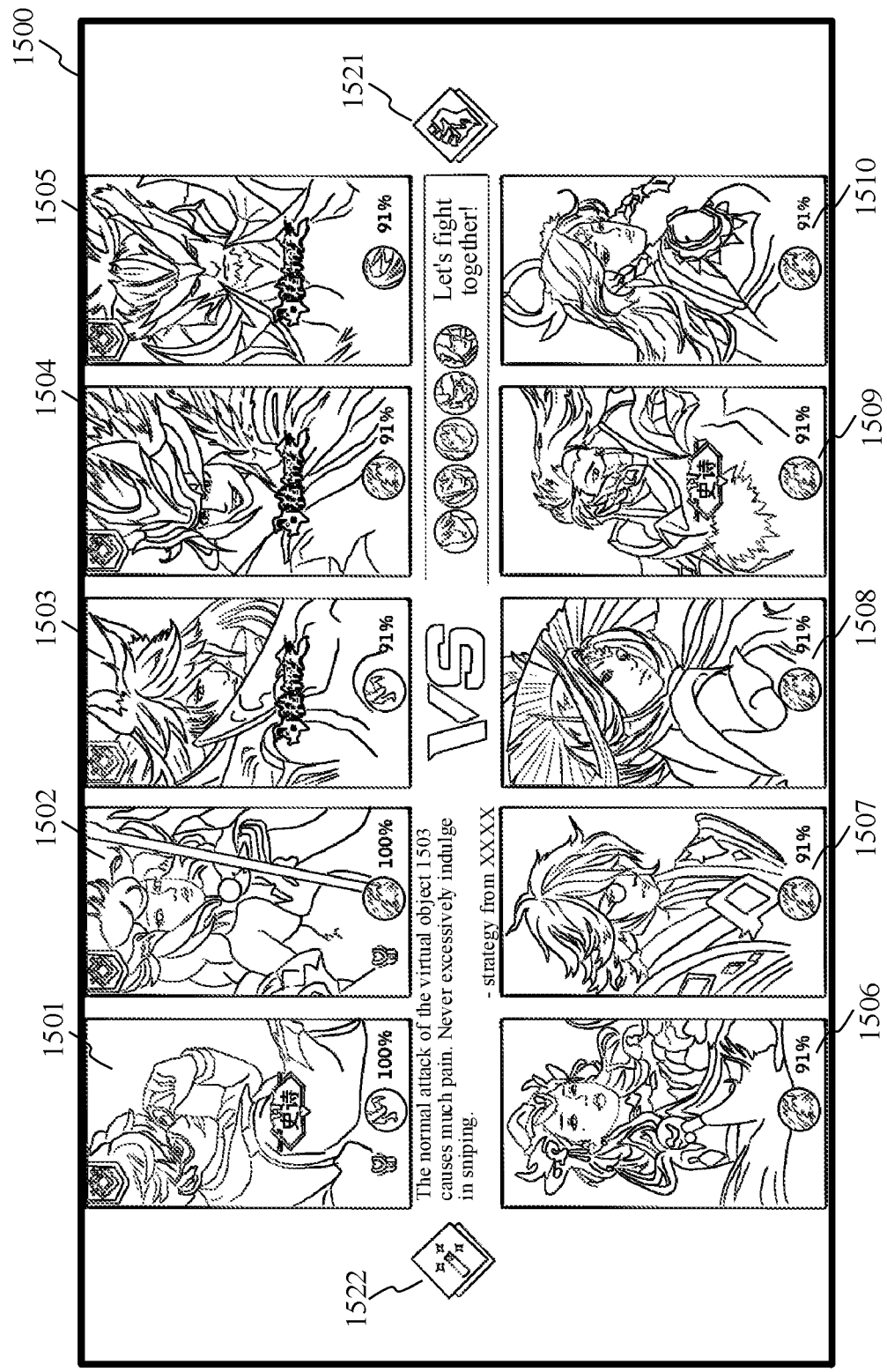
FIG. 15 is a schematic interface diagram of an object presentation interface according to an embodiment of this application.

FIG. 15 is a schematic interface diagram of an object presentation interface according to an embodiment of this application. As shown in FIG. 15, identity pictures of 10 virtual objects 1501 to 1510, that is, half-length portraits of 10 heroes are displayed in the object presentation interface 1500. Moreover, an encouragement option 1521 and a triggering option 1522 of a special effect are further displayed in the object presentation interface 1500. In this case, the encouragement option 1521 and the triggering option 1522 are both in an active state. The encouragement option 1521 is used for cheering and encouraging the current camp, and a user triggers, through a triggering operation on the encouragement option 1521, to display some preset text information used for encouragement in the object presentation interface 1500. The triggering option 1522 is used for triggering the special effect, and the user triggers, through a triggering operation on the triggering option 1522, to perform the following step 1404, that is, transmit a special effect triggering request to a server.

In some other embodiments, when the user sets the special effect contest function to a disabled state in the battle start configuration interface, the first terminal does not display the triggering option of the special effect in the object presentation interface, in other words, the first terminal does not render the triggering option of the special effect in the object presentation interface, and then the first terminal does not perform steps 1403 and 1404. When another terminal participating in the target battle triggers the special effect, the terminal performs steps 1408 and 1409. However, because the triggering option of the special effect is not displayed, modification on the state of the triggering option of the special effect in steps 1410 to 1412 is not performed either.

Figure 16:
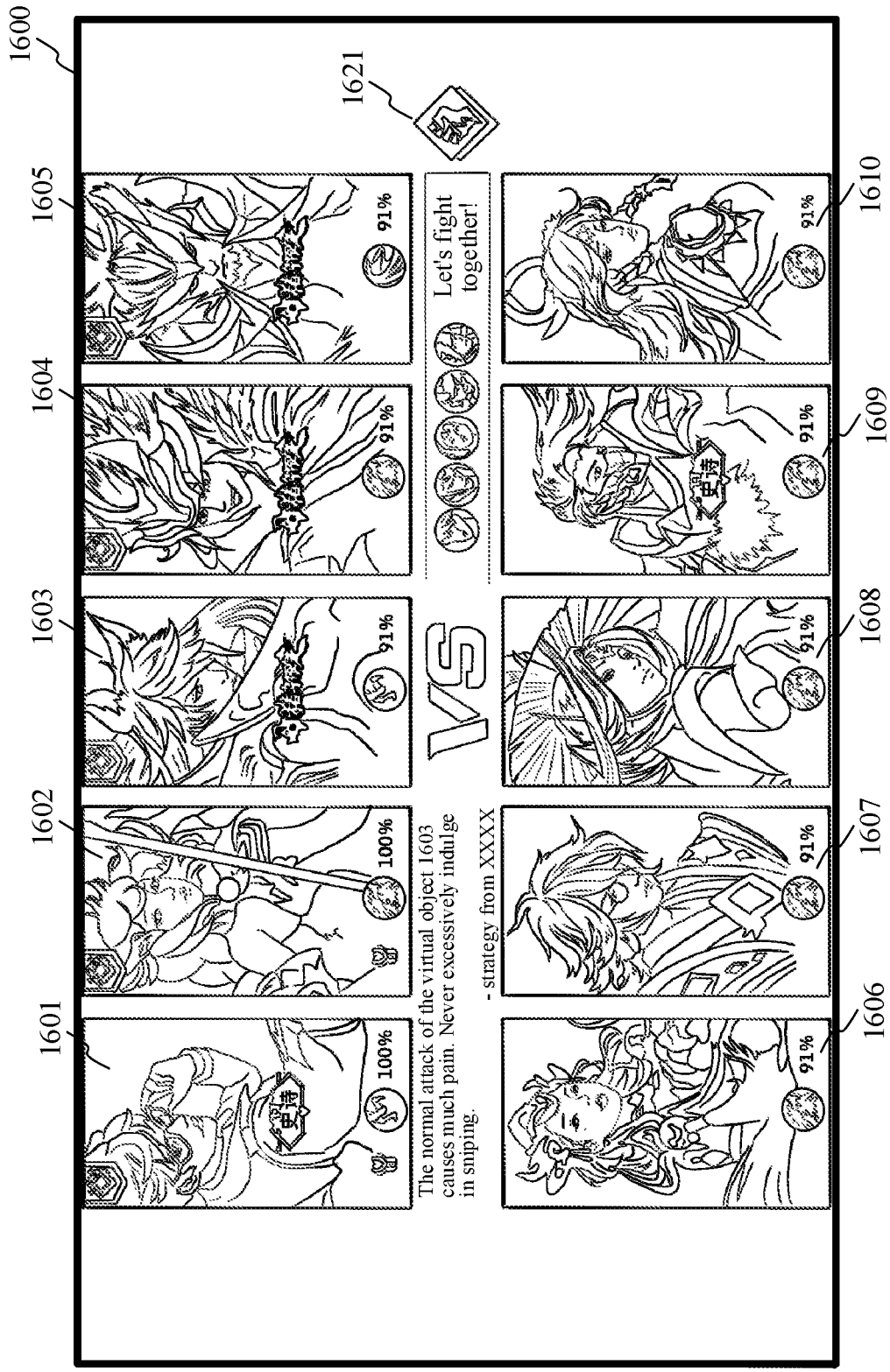
FIG. 16 is a schematic interface diagram of an object presentation interface according to an embodiment of this application.

FIG. 16 is a schematic interface diagram of an object presentation interface according to an embodiment of this application. As shown in FIG. 16, identity pictures of 10 virtual objects 1601 to 1610, that is, half-length portraits of 10 heroes are displayed in the object presentation interface 1600. Moreover, an encouragement option 1621 is further displayed in the object presentation interface 1600, and the encouragement option 1621 is in an active state. The encouragement option 1621 is used for cheering and encouraging the current camp, and a user triggers, through a triggering operation on the encouragement option 1621, to display some preset text information used for encouragement in the object presentation interface 1600.

1404. The first terminal transmits a special effect triggering request to a server in response to a triggering operation of the user on the triggering option, where the special effect triggering request is used for requesting to trigger the special effect.

In some embodiments, taking an example in which the triggering operation is a touch operation, the first terminal detects, through a touch sensor, whether the user touches a display screen, and determines screen coordinates of a touch point of the user; and when the screen coordinates of the touch point fall within a coordinate range covered by the triggering option, and a touch duration of the user for the touch point exceeds an accidental touch determining threshold, determines that a touch operation on the triggering option is detected, that is, determines that the user performs a triggering operation on the triggering option, and transmits a special effect triggering request to the server in response to the triggering operation, where the special effect triggering request carries at least the ID of the virtual object corresponding to the first terminal, and a triggering moment of the triggering operation. In some embodiments, the special effect triggering request may further carry a device ID of the first terminal, an account ID logging in to the first terminal, an effect ID of the special effect, and the like. This is not limited in this embodiment of this application.

In some embodiments, the first terminal may compress the special effect triggering request and then transmit the compressed special effect triggering request to the server, thereby saving overheads of communication between the first terminal and the server, and a compression algorithm used for compression is not limited in this embodiment of this application.

In some embodiments, the first terminal may encrypt the special effect triggering request by using an encryption algorithm and then transmit the encrypted special effect triggering request to the server, thereby improving security of the information transmission process, an encryption algorithm used for encryption is a symmetric encryption algorithm or an asymmetric encryption algorithm, and the type of the encryption algorithm is not limited in this embodiment of this application.

In this embodiment of this application, description is made by using only an example in which triggering is performed based on the triggering option. In some embodiments, in addition to performing triggering based on the triggering option, the first terminal may further support at least one of the following triggering manners: a triggering operation on the identity picture of the virtual object corresponding to the first terminal, a triggering operation on a designated region (for example, an upper left corner, an upper right corner, the middle of a left edge, or a bottom center), and the like, and each of the foregoing several triggering manners is a manner in which the user performs active triggering. In some other embodiments, when a particular condition is met, the first terminal is automatically triggered to transmit the special effect triggering request to the server. For example, the particular condition is that automatic triggering is performed while displaying the object presentation interface, or the particular condition is that the user actively triggers the special effect in a previous battle of the target battle, or the particular condition is that a quantity of rounds in which the user uses the current virtual object reaches a target quantity of rounds (for example, 100 rounds, 500 rounds, or 1000 rounds). Content of the particular condition is not limited in this embodiment of this application. For the foregoing different active triggering manners or passive triggering manners, the first terminal may support only a triggering manner (that is, excluding other triggering manners), thereby reducing a possibility that the user incorrectly operates, to improve the user experience, or the first terminal may support a plurality of triggering manners (that is, compatible with a plurality of triggering manners), so that the user customizes selection of a most accustomed and most convenient triggering manner to trigger the special effect.

1405. The server receives at least one special effect triggering request transmitted by at least one terminal.

The special effect triggering request is used for requesting to trigger a special effect of a corresponding virtual object.

Because the first terminal also transmits the special effect triggering request to the server, the at least one terminal includes the first terminal. The at least one terminal is some or all of a plurality of terminals participating in the target battle. Not every terminal participating in the target battle enables the special effect contest function. Therefore, even if the special effect contest function is enabled, not every user performs a triggering operation on the triggering option. Therefore, a quantity of terminals transmitting the special effect triggering request is less than or equal to a total quantity of all the terminals participating in the target battle.

In some embodiments, because there may be one or more terminals participating in triggering the special effect, the server receives at least one special effect triggering request transmitted by at least one terminal. Each special effect triggering request carries at least the ID of the virtual object corresponding to the terminal, and the triggering moment of the triggering operation. In some embodiments, each special effect triggering request may further carry a device ID of the terminal, an account ID logging in to the terminal, an effect ID of the special effect, and the like. This is not limited in this embodiment of this application.

In some embodiments, after receiving any request of any terminal, the server parses a target field (for example, header field) of the any request, determines, when the target field carries a special effect triggering identifier, the any request as the special effect triggering request, and parses other fields (for example, data field) of the special effect triggering request, to obtain an ID of a virtual object corresponding to the any terminal and the triggering moment of the triggering operation.

In some embodiments, the special effect triggering identifier is a request type ID used for identifying the special effect triggering request. In this case, the request type ID is encapsulated in the target field of the special effect triggering request, and the ID of the virtual object corresponding to the any terminal and the triggering moment of the triggering operation are encapsulated in other fields. In this case, data transmission accuracy can be ensured.

In some other embodiments, the special effect triggering identifier is an effect ID of the special effect. In this case, the effect ID of the special effect is encapsulated in the target field of the special effect triggering request, and the ID of the virtual object corresponding to the any terminal and the triggering moment of the triggering operation are encapsulated in other fields. In this case, overheads of communication between the terminal and the server can be saved.

In some embodiments, from an initial moment of loading a virtual scene or after a previous round of special effect display is completed, a new round of special effect contest process may be started. When the server receives a first special effect triggering request in the current round of special effect contest process, a target time period may be determined, where the target time period takes a receiving moment of the first special effect triggering request as a start moment and a moment with a target time interval after the start moment as an end moment, and then the at least one special effect triggering request received in the target time period is obtained. The target time interval is any value greater than 0. For example, the target time interval is 0.3 seconds, and the target time interval may be dynamically configured by a technician or may be set to a default value. This is not limited in this embodiment of this application.

In the foregoing process, at the initial moment of loading the virtual scene, or when display of a previous special effect is completed (that is, cool down of the previous round of special effect display ends), each terminal participating in the target battle and enabling the special effect contest function transmits a special effect triggering request to the server through the triggering operation of the user on the triggering option, and the server receives at least one special effect triggering request of at least one terminal (that is, client) at the back end.

In some embodiments, the server may receive a special effect triggering request only in the target time period. When a special effect triggering request is transmitted to the server only after the target time period, a stage of screening a first target object and delivering the special effect generating instruction is reached after the target time period ends. Therefore, the current round of special effect contest enters a cool down stage equivalently, the server does not respond to the special effect triggering request received in this cool down stage, and then the server may ignore the special effect triggering request or reject the special effect triggering request.

each terminal may be set to be capable of transmitting a special effect triggering request only once in the target time period, which can alleviate load pressure on the server and save overheads of communication between the terminal and the server. Certainly, each terminal may be alternatively set to support transmitting a special effect triggering request for a plurality of times in the target time period. This is not limited in this embodiment of this application.

In an exemplary scenario, the special effect may be referred to as a "backdrop" special effect, and the special effect triggering request is referred to as a backdrop contest request. Then, at the initial moment of loading the virtual scene or after playing of a previous round of backdrop special effect is completed, the server starts a new round of backdrop contest process. In the new round of backdrop contest process, count begins when the first backdrop contest request is received, and in subsequently 0.3 seconds, the server may receive a backdrop contest request of another terminal, and place the backdrop contest requests together in a cache pool, to make it convenient to screen the first virtual object from this cache pool.

1406. The server determines a first virtual object meeting a target condition in at least one virtual object corresponding to the at least one special effect triggering request.

The first virtual object corresponds to the electronic device triggering the special effect, and there are one or more first virtual objects. That is, only one virtual object is allowed to contest a special effect triggering right in each round of contesting a special effect, or a plurality of virtual objects are allowed to contest a special effect triggering right in each round of contesting a special effect. The quantity of first virtual objects is not limited in this embodiment of this application.

In some embodiments, when the server receives only one special effect triggering request in the target time period, a virtual object corresponding to a terminal transmitting the special effect triggering request is directly determined as the first virtual object, in other words, a virtual object indicated by an ID carried in the special effect triggering request is determined as the first virtual object.

In some embodiments, when the server receives a plurality of special effect triggering requests in the target time period, the first virtual object meeting the target condition is screened through a decision algorithm. In this embodiment of this application, description is made by using an example in which there is one first virtual object, and the decision algorithm may include: determining, by the server, a target camp to which a historical virtual object triggering the special effect last time belongs; obtaining at least one historical triggering situation of the at least one virtual object for the special effect; and determining the first virtual object meeting the target condition based on the at least one historical triggering situation and the target camp.

In the foregoing process, decision making not only considers the target camp to which the historical virtual object triggering the special effect last time belongs, but also considers whether the special effect is successfully triggered last time on each terminal. In some embodiments, a virtual object not belonging to the target camp is selected. In some embodiments, a triggering object unsuccessfully triggering the special effect last time is selected. In this way, the special effect triggering situation can be more balanced, so that a maximum quantity of terminals successfully trigger the special effect, to avoid a phenomenon that the same user repeatedly grabs the special effect to cause other users to be deprived of interaction experience.

In some embodiments, when screening the first virtual object, the server may perform screening according to priorities of virtual objects, that is to say, the server determines a priority of the at least one virtual object based on the at least one historical triggering situation and the target camp; and selects, from virtual objects with a highest priority, a virtual object with an earliest triggering moment as the first virtual object.

In other words, for all virtual objects, the server determines respective priorities of the virtual objects according to historical triggering situations and whether to belong to the target camp, and performs selection in descending order of the priorities. When there is only one virtual object with the highest priority, the virtual object with the highest priority is selected as the first virtual object. When there are a plurality of virtual objects with the highest priority, a virtual object with a highest triggering moment is selected from the virtual objects with the same priority as the first virtual object.

In the foregoing process, by performing screening in descending order of priorities, relatively low priorities may be set for some camps having grabbed the special effect or virtual objects having grabbed the special effect, so that the special effect triggering situation is more balanced, that is, it is ensured that a maximum quantity of terminals successfully trigger the special effect, to avoid a phenomenon that the same user repeatedly grabs the special effect to cause other users to be deprived of interaction experience.

In some embodiments, in descending order, priorities are divided into four grades: a first priority, a second priority, a third priority, and a fourth priority, where the first priority is highest and the fourth priority is lowest. The first priority means that a virtual object does not belong to the target camp and a historical triggering situation is non-triggered; the second priority means that a virtual object belongs to the target camp and a historical triggering situation is non-triggered; the third priority means that a virtual object does not belong to the target camp and a historical triggering situation is triggered; and the fourth priority means that a virtual object belongs to the target camp and a historical triggering situation is triggered.

In the foregoing process, an example of dividing priorities based on the target camp and the historical triggering situation is given. In some embodiments, when priorities are divided, the priorities are divided into two grades considering only the target camp but without considering the historical triggering situation; or the priorities are also divided into two grades considering only the historical triggering situation but without considering the target camp. A manner of dividing priorities is not limited in this embodiment of this application.

The foregoing determining the first target object considering the priority and the triggering moment is equivalent to setting the target condition to that a triggering moment of a virtual object with the highest priority is earliest. In some embodiments, the target condition may be alternatively set to that a priority of a virtual object with the earliest triggering moment is highest, in other words, the first virtual object is first selected in an order of triggering moments. When only one virtual object with the earliest triggering moment exists, the virtual object with the earliest triggering moment is directly determined as the first virtual object. When a plurality of virtual objects with the earliest triggering moment exist, the virtual object with the highest priority is selected as the first virtual object. In some embodiments, when the priorities are highest and the triggering moments are the same, a virtual object is randomly selected as the first virtual object. A manner of screening the first virtual object is not limited in this embodiment of this application.

In some embodiments, the server may alternatively perform random sampling directly in the at least one virtual object, and take the sampled virtual object as the first virtual object, thereby increasing randomness of the process of screening the first virtual object.

1407. The server transmits a special effect generating instruction for the first virtual object to terminals participating in the target battle, the special effect generating instruction being used for instructing to generate the special effect based on the first virtual object.

The terminals participating in the target battle include the at least one terminal, and because the at least one terminal includes the first terminal, the terminals participating in the target battle also include the first terminal. That is to say, although the terminals participating in the special effect contest are not all the terminals participating in the target battle, the server needs to deliver, after making a decision to determine the first virtual object, the special effect generating instruction to all the terminals participating in the target battle.

In some embodiments, the server may compress the special effect generating instruction and then transmit the compressed special effect generating instruction to the terminals participating in the target battle, thereby saving overheads of communication between the server and the terminals, and a compression algorithm used for compression is not limited in this embodiment of this application.

In some embodiments, the server may encrypt the special effect generating instruction by using an encryption algorithm and then transmit the encrypted special effect generating instruction to the terminals participating in the target battle, thereby improving security of the information transmission process, an encryption algorithm used for encryption is a symmetric encryption algorithm or an asymmetric encryption algorithm, and the type of the encryption algorithm is not limited in this embodiment of this application.

Figure 17:
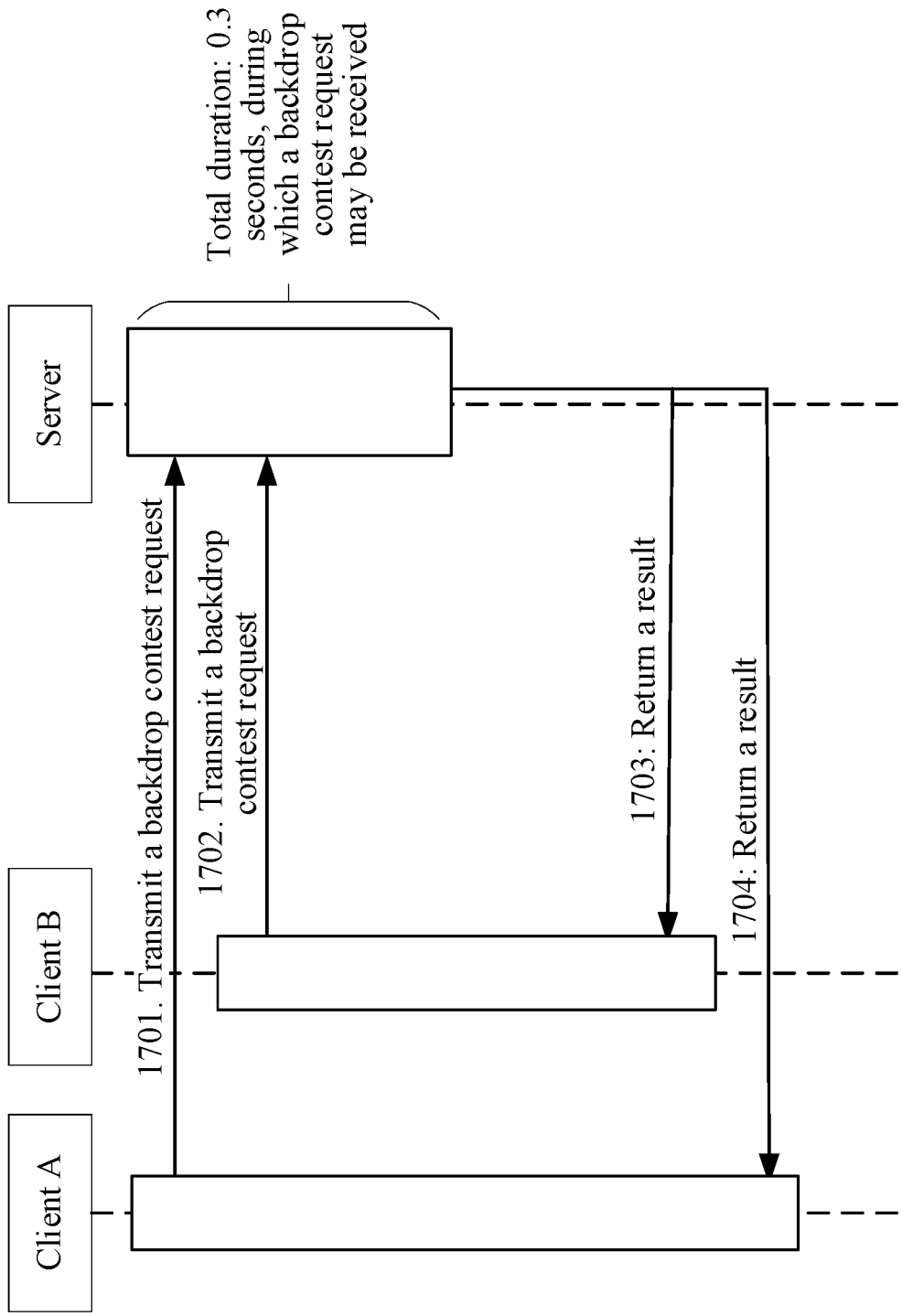
FIG. 17 is a principle flowchart of a special effect contest process according to an embodiment of this application.

FIG. 17 is a principle flowchart of a special effect contest process according to an embodiment of this application. Referring to FIG. 17, description is made by using an example in which a special effect is a backdrop special effect and a special effect triggering request is a backdrop contest request. When a client A and a client B request to contest a backdrop in the current round, in step 1701, the client A transmits a backdrop contest request to a server; in step 1702, the client B transmits a backdrop contest request to the server, where a time interval between the two backdrop contest requests is less than a target time interval (for example, 0.3 seconds), the server makes a decision, by using a decision algorithm, to determine one or more first virtual objects finally grabbing a backdrop, and the server may receive a backdrop contest request of a user within 0.3 seconds and ignore or reject the backdrop contest request beyond 0.3 seconds; in step 1703, the server returns a result to the client B; and in step 1704, the server returns a result to the client A. Step 1703 and step 1704 are not performed in a time sequence, and the results may be returned one after another or may be returned simultaneously in the two steps.

In some embodiments, the server may transmit the special effect generating instruction to the terminals in a broadcast manner, that is, the server broadcasts the special effect generating instruction to the terminals, to ensure that all the terminals participating in the target battle receive the same message. For reasons such as network fluctuation, even if the terminals may receive the special effect generating instruction at different moments, all the terminals can display the special effect at a uniform time from the display moment of the special effect through the display moment of the special effect carried in the special effect generating instruction. Moreover, because the display duration of the special effect may be further counted through the following step 1411, and the display moment of the special effect is a count start point, it may be further ensured that the terminals see consistent count information (for example, count or countdown).

1408. The first terminal receives a special effect generating instruction for a first virtual object of the plurality of virtual objects.

Step 1408 is similar to step 1202, and details are not described herein again.

1409. The first terminal generates the special effect in the object presentation interface.

Step 1409 is similar to step 1203, and details are not described herein again.

1410. The first terminal sets the triggering option to an inactive state when the special effect is successfully triggered based on the special effect triggering request.

In some embodiments, after receiving the special effect generating instruction, the first terminal may parse the special effect generating instruction to obtain the ID of the first virtual object, and determine, when the ID of the first virtual object includes the ID of the virtual object corresponding to the first terminal, that the special effect is successfully triggered based on the special effect triggering request; and determine, when the ID of the first virtual object does not include the ID of the virtual object corresponding to the first terminal, that the special effect is unsuccessfully triggered based on the special effect triggering request.

When the special effect is successfully triggered based on the special effect triggering request, the triggering option may be set to the inactive state. In this way, even if the user clicks/taps the triggering option because of an incorrect operation during display of the special effect, an invalid special effect triggering request is not repeatedly transmitted to the server, thereby saving overheads of communication with the server.

In some embodiments, the setting the triggering option to the inactive state means that the first terminal modifies the triggering option from the "enabled" state to the "disabled" state in the UI setting.

1411. The first terminal displays a count control of the special effect in the object presentation interface, where the count control of the special effect is used for recording a display duration of the special effect.

1412. The first terminal sets the triggering option from the inactive state to an active state in response to a case that it is determined based on the count control that a display duration of the special effect exceeds a target duration.

In some embodiments, when the countdown control indicates that countdown is 0, the first terminal determines that the display duration of the special effect reaches the target duration; or when the count control indicates that count is the target duration, the first terminal determines that the display duration of the special effect reaches the target duration. Then, the first terminal sets the triggering option from the inactive state to the active state, indicating that a new round of special effect contest link has started. In this case, the user may return to step 1404, to contest the triggering right of the special effect in the new round of special effect contest link again through the triggering operation on the triggering option. In some embodiments, the setting the triggering option from the inactive state to the active state means that the first terminal modifies the triggering option from the "disabled" state to the "enabled" state in the UI setting.

All of the above optional technical solutions can be combined randomly to form optional embodiments of this application. Details are not described herein again.

Based on the method provided in this embodiment of this application, a corresponding special effect is displayed based on the first virtual object corresponding to the terminal triggering the special effect in the object presentation interface of the target battle, so that in a process of presenting virtual objects participating in the target battle, an innovative social networking interaction manner based on a special effect is provided, and a positive game feedback is provided in the object presentation interface, thereby improving the man-machine interaction effect. Further, for the object presentation interface displayed in the virtual scene loading process, a case that the user can perform only boring and tiresome wait is avoided, and in the loading process through which the battle has to pass and to which extremely high attention is paid, virtual objects can be customized and presented and social networking interaction can be performed, thereby greatly improving recreation experience of the user.

In the foregoing embodiment, how to trigger the special effect is described by using the first terminal as an example, and the decision algorithm used when the server screens the first target object is described. When the terminals display the special effect, the social networking interaction function (for example, the like giving function) for the special effect may be further provided. Therefore, the terminals may further display the social networking interaction option during display of the special effect, thereby triggering the social networking interaction function based on the social networking interaction option. Details are described in this embodiment of this application.

Figure 18:
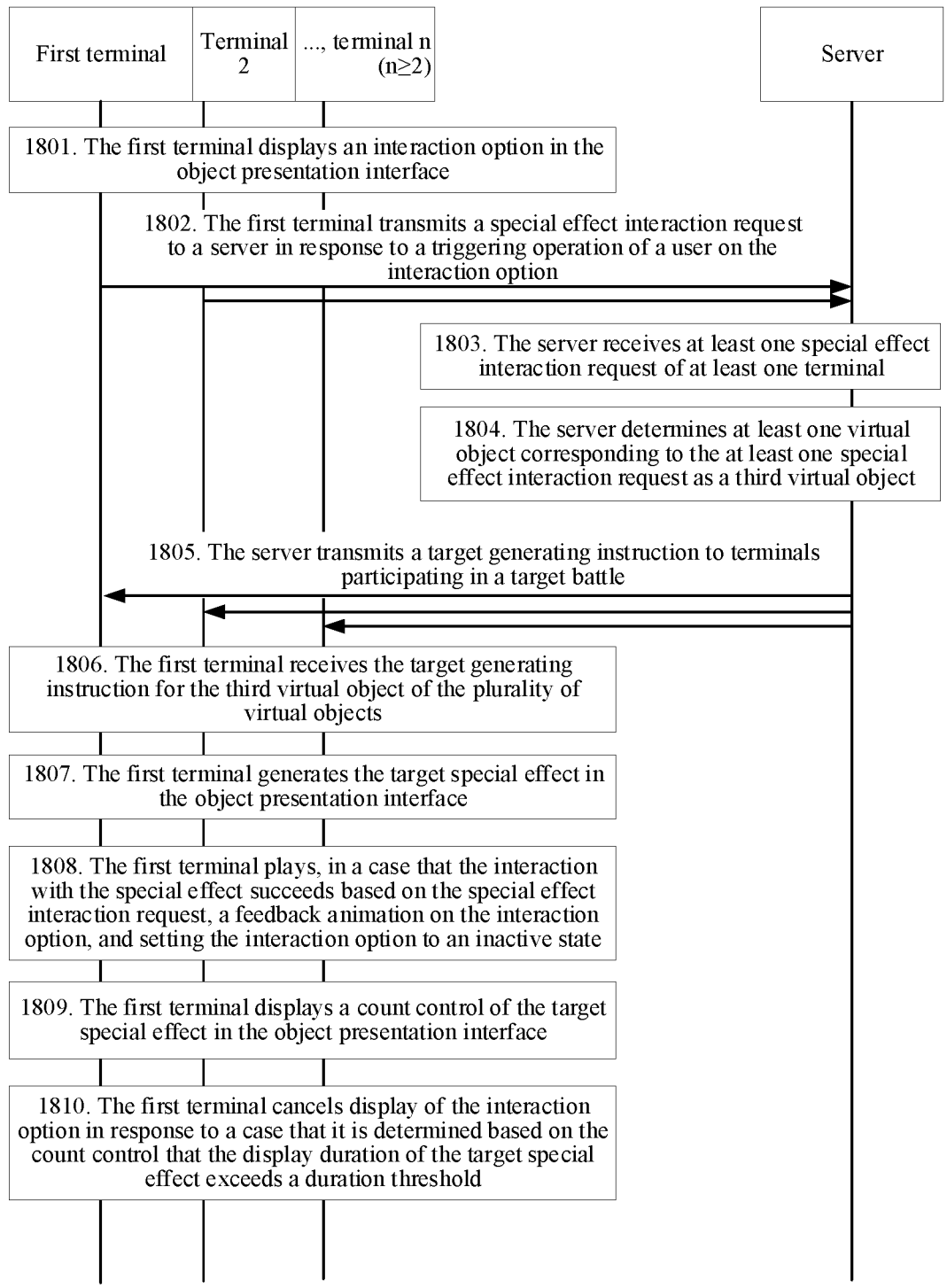
FIG. 18 is an interaction flowchart of a method for generating a special effect in a virtual environment according to an embodiment of this application.

FIG. 18 is an interaction flowchart of a method for generating a special effect in a virtual environment according to an embodiment of this application. Referring to FIG. 18, the embodiment is applied to an interaction process between terminals participating in a target battle and a server. After all the terminals participating in the target battle display the special effect of the first virtual object, in this embodiment of this application, a process of how does any terminal interact with the special effect of the first virtual object is described by using the first terminal as an example. The embodiment includes the following steps:

1801. The first terminal displays a social networking interaction option in the object presentation interface, where the social networking interaction option is used for providing a social networking interaction function for the special effect of the first virtual object.

In some embodiments, when the first terminal enables the special effect contest function and contests the special effect successfully, it may be set that the first terminal is not allowed to interact with the first terminal, that is, steps 1801 and 1802 provided in this embodiment of this application do not need to be designated, that is, the social networking interaction option is not displayed in the object presentation interface, but the triggering option in the inactive state is displayed. When another terminal interacts with the first terminal, the first terminal may still perform steps 1806 and 1807, to display a target special effect triggered after the another terminal interacts with the first terminal.

In some embodiments, when the first terminal enables the special effect contest function and contests the special effect successfully, it is set that the first terminal is allowed to interact with the first terminal, and therefore the steps provided in this embodiment of this application may be performed, that is, the triggering option in the inactive state and the social networking interaction option are displayed in the object presentation interface. This is not limited in this embodiment of this application.

In some embodiments, when the first terminal enables the special effect contest function and contests the special effect unsuccessfully, display of the triggering option of the special effect may be canceled in the object presentation interface, but the social networking interaction option is displayed in the same location, to present a visual effect of updating the triggering option to the social networking interaction option, so that deployment of the object presentation interface is more refreshing.

In some embodiments, when the first terminal disables the special effect contest function, the triggering option of the special effect is not displayed in the object presentation interface in the beginning, but after another terminal contests the special effect successfully, the first terminal receives the special effect generating instruction of the server, and displays the special effect of the first virtual object based on the special effect generating instruction. In this case, the social networking interaction option may be added in the object presentation interface.

By displaying the social networking interaction option in the object presentation interface, a social networking interaction function is provided for the user, and the user can quickly interact with another user by triggering the social networking interaction option, so that the man-machine interaction efficiency is relatively high.

Figure 19:
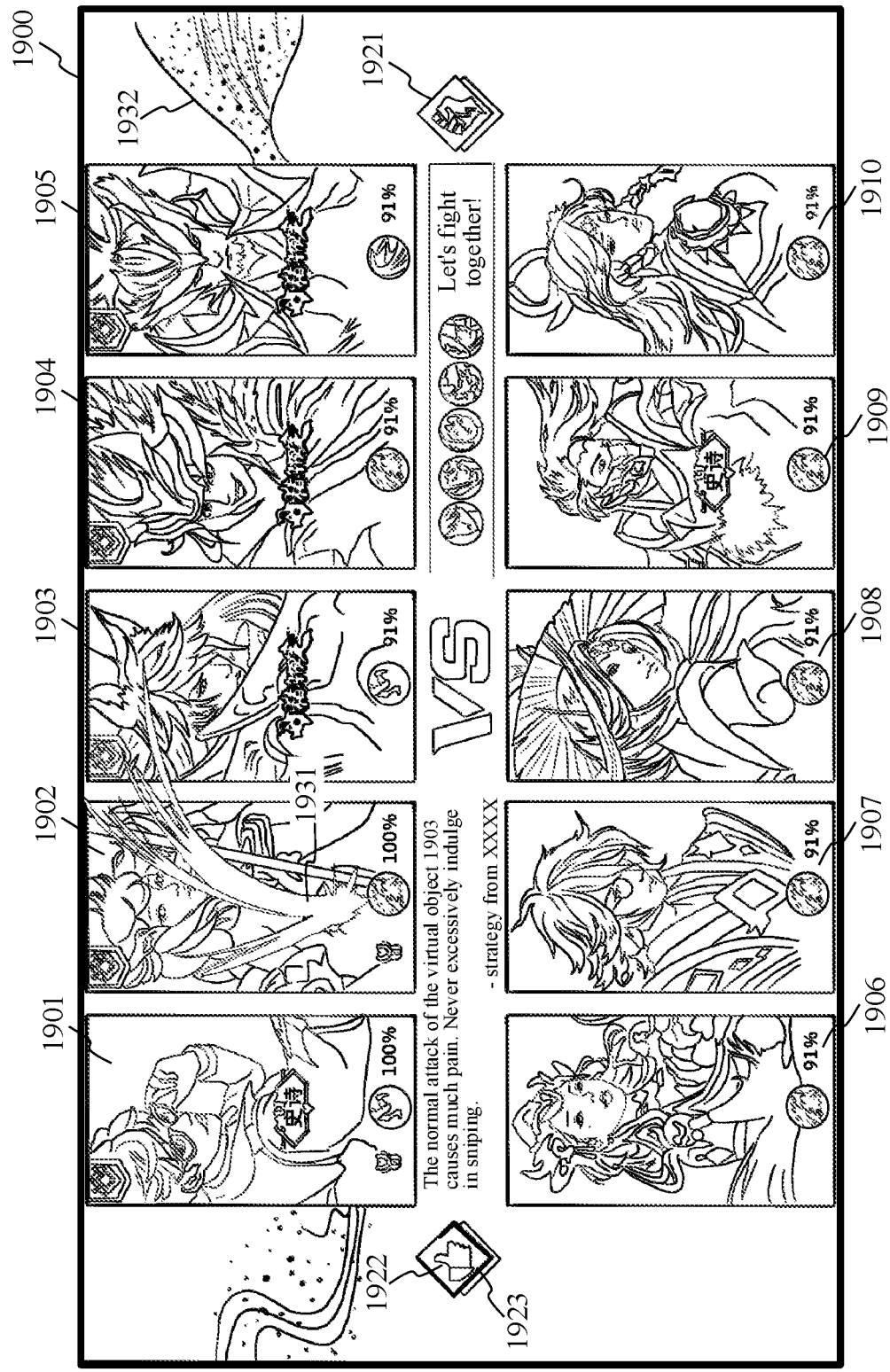
FIG. 19 is a schematic diagram of an object presentation interface according to an embodiment of this application.

FIG. 19 is a schematic diagram of an object presentation interface according to an embodiment of this application. As shown in FIG. 19, identity pictures of 10 virtual objects 1901 to 1910, that is, half-length portraits of 10 heroes are displayed in the object presentation interface 1900. Moreover, an encouragement option 1921 and a social networking interaction option 1922 are further displayed in the object presentation interface 1900. The encouragement option 1921 is in an active state. The encouragement option 1921 is used for cheering and encouraging the current camp, and a user triggers, through a triggering operation on the encouragement option 1921, to display some preset text information used for encouragement in the object presentation interface 1900. The interaction option 1922 is also in an active state. In this case, it may be seen that a first virtual object is the virtual object 1902. In this case, a first special effect 1931 is displayed on an identity picture of the virtual object 1902 in the object presentation interface 1900, and a second special effect 1932 is displayed in a background region of identity pictures of the virtual objects 1901 to 1905 in a camp to which the virtual object 1902 belongs. The interaction option 1922 is used for providing a social networking interaction function for the first special effect 1931 or the second special effect 1932 of the virtual object 1902. Description is made by using an example in which the social networking interaction function is a like giving function. Certainly, a dislike giving function may be further provided. This is not limited in this embodiment of this application. The edge of the social networking interaction option 1922 is actually a countdown control 1923. Before countdown of the countdown control 1923 reaches 0, the user may perform a triggering operation on the social networking interaction option 1922, to trigger to transmit a special effect social networking interaction request to the server. For example, the total count duration of the countdown control 1923 is 5 seconds, and the user may perform a triggering operation on the social networking interaction option 1922 within 5 seconds of displaying the special effect, to trigger to transmit the special effect social networking interaction request to the server.

1802. The first terminal transmits a special effect social networking interaction request to a server in response to a triggering operation of a user on the social networking interaction option, where the special effect social networking interaction request is used for instructing to perform interaction with the special effect of the first virtual object.

In some embodiments, taking an example in which the triggering operation is a touch operation, the first terminal detects, through a touch sensor, whether the user touches a display screen, and determines screen coordinates of a touch point of the user; and when the screen coordinates of the touch point fall within a coordinate range covered by the social networking interaction option, and a touch duration of the user for the touch point exceeds an accidental touch determining threshold, determines that a touch operation on the social networking interaction option is detected, that is, determines that the user performs a triggering operation on the social networking interaction option, and transmits a special effect social networking interaction request to the server in response to the triggering operation, where the special effect social networking interaction request carries at least the ID of the virtual object (that is, an ID of a like giver) corresponding to the first terminal, and a triggering moment of the triggering operation, and the ID of the first virtual object (that is, an ID of a like taker).

In some embodiments, the first terminal may compress the special effect social networking interaction request and then transmit the compressed special effect social networking interaction request to the server, thereby saving overheads of communication between the first terminal and the server, and a compression algorithm used for compression is not limited in this embodiment of this application.

In some embodiments, the first terminal may encrypt the special effect social networking interaction request by using an encryption algorithm and then transmit the encrypted special effect social networking interaction request to the server, thereby improving security of the information transmission process, an encryption algorithm used for encryption is a symmetric encryption algorithm or an asymmetric encryption algorithm, and the type of the encryption algorithm is not limited in this embodiment of this application.

1803. The server receives at least one special effect social networking interaction request of at least one terminal.

Because the first terminal also transmits the special effect social networking interaction request to the server, the at least one terminal includes the first terminal. The at least one terminal is some or all of a plurality of terminals participating in the target battle. Not every user intends to interact with (for example, give a like to) the special effect of the first virtual object. Therefore, a quantity of terminals transmitting the special effect social networking interaction request is less than or equal to a total quantity of all the terminals participating in the target battle.

In some embodiments, because at least one terminal may initiate, in the same time period, a special effect social networking interaction request for interacting with the special effect of the first virtual object, the server receives at least one special effect social networking interaction request transmitted by the at least one terminal. Each special effect social networking interaction request carries at least the ID of the virtual object corresponding to the terminal (that is, an ID of a like giver), and the ID of the first virtual object (that is, an ID of a like taker).

The foregoing process is equivalent to that the server aggregates a batch of special effect social networking interaction requests in the same time period, thereby saving overheads of communication with the terminals. In some embodiments, alternatively, each time the server receives a special effect social networking interaction request, the server may broadcast the ID of the like giver and the ID of the like taker carried in the special effect social networking interaction request to the terminals participating in the target battle, thereby improving real-time performance of displaying the target special effect.

In some embodiments, after receiving any request of any terminal, the server parses a target field (for example, header field) of the any request, determines, when the target field carries a special effect interaction identifier, the any request as the special effect social networking interaction request, and parses other fields (for example, data field) of the special effect social networking interaction request, to obtain the ID of the like giver and the ID of the like taker.

In some embodiments, the special effect interaction identifier is a request type ID used for identifying the special effect social networking interaction request. In this case, the request type ID is encapsulated in the target field of the special effect social networking interaction request, and the ID of the like giver and the ID of the like taker are encapsulated in other fields. In this case, data transmission accuracy can be ensured.

In some other embodiments, the special effect interaction identifier is the ID of the like taker. In this case, the ID of the like taker is encapsulated in the target field of the special effect social networking interaction request, and the ID of the like giver is encapsulated in other fields. In this case, overheads of communication between the terminal and the server can be saved.

1804. The server determines at least one virtual object corresponding to the at least one special effect social networking interaction request as a third virtual object.

The third virtual object is a virtual object triggering to perform interaction with the special effect of the first virtual object.

In some embodiments, the server aggregates the received at least one special effect social networking interaction request. These special effect social networking interaction requests may not belong to the same battle. Therefore, the server may scan the at least one special effect social networking interaction request, and extract target special effect social networking interaction requests in which the ID of the like taker is equal to the ID of the first virtual object, and these target special effect social networking interaction requests are special effect social networking interaction requests belonging to the target battle. In this case, for the target special effect social networking interaction requests, IDs of like givers carried in the target special effect social networking interaction requests may be aggregated, to obtain a set of the IDs of the like givers, and each virtual object corresponding to the set of the IDs of the like givers is determined as the third virtual object.

1805. The server transmits a target generating instruction to terminals participating in a target battle, the target generating instruction being used for instructing to generate a target special effect based on the third virtual object, and the target special effect being a special effect of the third virtual object for performing interaction with the special effect of the first virtual object.

The terminals participating in the target battle include the at least one terminal, and because the at least one terminal includes the first terminal, the terminals participating in the target battle also include the first terminal. That is to say, although the terminals performing interaction with the special effect of the first virtual object are not all the terminals participating in the target battle, the server needs to deliver the target generating instruction to all the terminals participating in the target battle.

In some embodiments, the target generating instruction carries at least the set of the IDs of the like givers, the ID of the like taker, and the effect ID of the target special effect. In some embodiments, the target generating instruction may further carry a duration threshold for which the target special effect is continuously being displayed, and the duration threshold is any value greater than 0.

In some embodiments, the server may encapsulate the instruction type ID used for identifying the target generating instruction in the target field (for example, header field) of the target generating instruction, and encapsulate the set of the IDs of the like givers, the ID of the like taker, and the effect ID of the target special effect in other fields (for example, data field), thereby ensuring data transmission accuracy.

In some embodiments, the server may encapsulate the effect ID of the target special effect in the target field (for example, header field) of the target generating instruction, and encapsulate the set of the IDs of the like givers and the ID of the like taker in other fields (for example, data field), thereby saving overheads of communication between the terminal and the server.

In some embodiments, the server may compress the target generating instruction and then transmit the compressed target generating instruction to the terminals participating in the target battle, thereby saving overheads of communication between the server and the terminals, and a compression algorithm used for compression is not limited in this embodiment of this application.

In some embodiments, the server may encrypt the target generating instruction by using an encryption algorithm and then transmit the encrypted target generating instruction to the terminals participating in the target battle, thereby improving security of the information transmission process, an encryption algorithm used for encryption is a symmetric encryption algorithm or an asymmetric encryption algorithm, and the type of the encryption algorithm is not limited in this embodiment of this application.

In some embodiments, the server may transmit the target generating instruction to the terminals in a broadcast manner, that is, the server broadcasts the target generating instruction to the terminals, to ensure that all the terminals participating in the target battle receive the same message.

1806. The first terminal receives the target generating instruction for the third virtual object of the plurality of virtual objects.

the target generating instruction carries at least the set of the IDs of the like givers, the ID of the like taker, and the effect ID of the target special effect. In some embodiments, the target generating instruction may further carry a duration threshold for which the target special effect is continuously being displayed, and the duration threshold is any value greater than 0.

In some embodiments, after receiving any instruction transmitted by the server, the first terminal parses a target field (for example, header field) of the any instruction, determines, when the target field carries the instruction type ID used for identifying the target generating instruction, the any instruction as the target generating instruction, and parses other fields (for example, data field) of the target generating instruction, to obtain the set of the IDs of the like givers, the ID of the like taker, and the effect ID of the target special effect.

In some embodiments, after receiving any instruction transmitted by the server, the first terminal parses a target field (for example, header field) of the any instruction, determines, when the target field carries the effect ID of the target special effect, the any instruction as the target generating instruction, and parses other fields (for example, data field) of the target generating instruction, to obtain the set of the IDs of the like givers and the ID of the like taker.

In some embodiments, the target generating instruction received by the first terminal is compressed and encrypted, the first terminal may recognize an encryption algorithm and a compression algorithm, decrypt and decompress the target generating instruction based on corresponding decryption and decompression algorithms, and parse the decrypted and decompressed target generating instruction.

1807. The first terminal generates the target special effect in the object presentation interface, where the target special effect is a special effect of the third virtual object for performing interaction with the special effect of the first virtual object.

Through the foregoing step 1807, the first terminal can generate the target special effect in the object presentation interface when the third virtual object performs interaction with the first virtual object, to remind the user that the third virtual object successfully performs interaction with the special effect, and provide interaction feedback for the user corresponding to the third virtual object, thereby improving man-machine interaction efficiency.

In some embodiments, the first terminal displays the target special effect in a display region corresponding to the third virtual object in the object presentation interface.

In some embodiments, when virtual objects are displayed in the object presentation interface in the form of identity pictures, the display region corresponding to the third virtual object refers to an identity picture of the third virtual object. Alternatively, the display region corresponding to the third virtual object is a top region or bottom region of the identity picture of the third virtual object, or the display region corresponding to the third virtual object may be a full screen. This is not specifically limited in this embodiment of this application.

In some embodiments, when virtual objects are displayed in the object presentation interface in the form of 3D models, the display region corresponding to the third virtual object may refer to a three-dimensional space centered on the third virtual object. For example, the three-dimensional space is a cubic space or spherical space. The shape of the three-dimensional space is not specifically limited in this embodiment of this application, and the three-dimensional space is similar to a collision detection box of the third virtual object, and refers to a three-dimensional space within a target range around the third virtual object. Optionally, the display region corresponding to the third virtual object may be a designated 3D space that is specially used for displaying the target special effect in the object presentation interface, or the display region corresponding to the third virtual object may be a full screen. This is not specifically limited in this embodiment of this application.

In some embodiments, the target special effect may be divided into a like giver special effect and a like taker special effect. The like giver special effect refers to an interaction special effect of the third virtual object initiating like giving. For example, such a dynamic effect as "thumbs up" is displayed on the identity picture or 3D model of the third virtual object. The like taker special effect refers to an interaction special effect of the first virtual object to which likes are given. In this case, the special effect originally triggered the first virtual object is being played. Therefore, when likes are given, the originally displayed special effect is controlled to be enlarged, be increased in brightness, flicker for several seconds, and the like, that is, the original special effect of the first virtual object is converted from a first display form into a second display form. In some embodiments, the target special effect may alternatively include only the like giver special effect, that is, display of the special effect of the first virtual object is kept unchanged, but for the third virtual object initiating like giving, the corresponding interaction special effect is displayed.

In some embodiments, if description is made by using an example in which virtual objects are displayed in the object presentation interface in the form of identity pictures, the first terminal may display the like giver special effect on an identity picture of the third virtual object in the object presentation interface. For example, the like giver special effect is to display a "thumbs up" icon on a half-length portrait of the third virtual object.

In some embodiments, if description is made by using an example in which virtual objects are displayed in the object presentation interface in the form of 3D models, the first terminal may display the like giver special effect in a three-dimensional space centered on a 3D model of the third virtual object in the object presentation interface. For example, the like giver special effect is to display a "thumbs up" icon around a 3D model of the third virtual object.

In some embodiments, a representation form of the target special effect includes but not limited to any one or a combination of at least two of the following: picture, video, GIF image, animation, dynamic effect, sound effect, sticker, magic expression, magic special effect, Flash, VR special effect, AR special effect, and the like. The representation form of the target special effect is not limited in this embodiment of this application.

In some embodiments, when displaying the target special effect, for a target special effect of the type such as dynamic effect, sticker, or magic expression, the first terminal may search, based on the effect ID of the target special effect carried in the target generating instruction, for a target special effect resource corresponding to the effect ID from a local cache or magnetic disk, and renders the target special effect resource by using a GPU, to display the target special effect in the display region.

In some embodiments, when displaying the target special effect, for a target special effect of the type such as animation, Flash, or video, the first terminal may search, based on the effect ID of the target special effect carried in the target generating instruction, for a target special effect resource corresponding to the effect ID from a local cache or magnetic disk, and plays the target special effect resource by invoking play control, thereby displaying the target special effect in the display region.

In the foregoing process, only a case that the first terminal loads the target special effect resource corresponding to the target special effect in the cache or magnetic disk is used as an example for description. In some embodiments, when the first terminal does not pre-store the target special effect resource corresponding to the target special effect locally, the first terminal may obtain the target special effect resource corresponding to the target special effect, and then display the target special effect based on the target special effect resource. In some embodiments, the target special effect resource corresponding to the target special effect is carried in the target generating instruction; or the target special effect resource corresponding to the target special effect is not carried in the target generating instruction, and instead it is necessary for the first terminal to transmit a target special effect resource request to the server again, to request the server to return the target special effect resource corresponding to the target special effect. A manner of obtaining the target special effect resource is not limited in this embodiment of this application.

Figure 20:
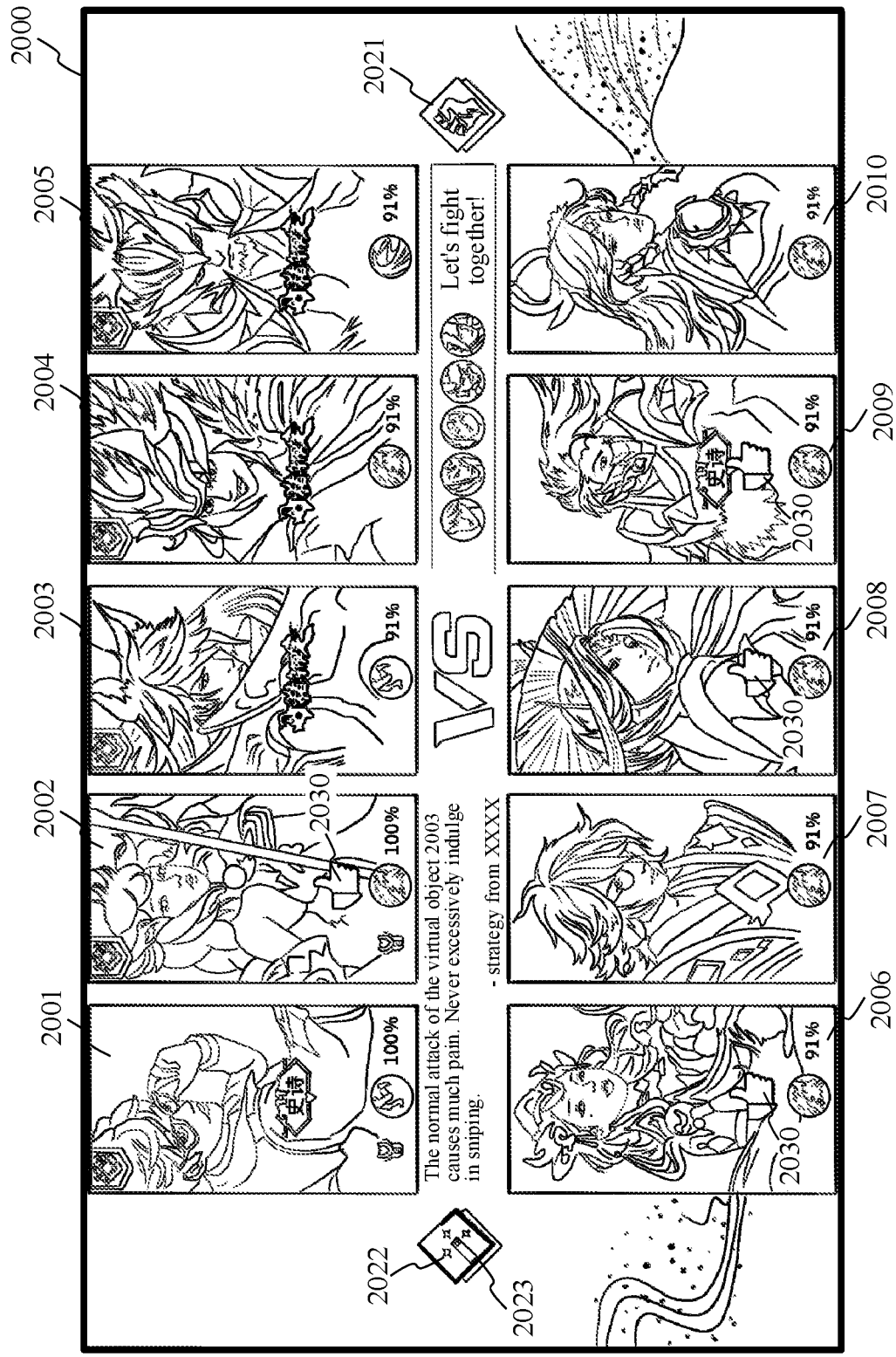
FIG. 20 is a schematic diagram of an object presentation interface according to an embodiment of this application.

FIG. 20 is a schematic diagram of an object presentation interface according to an embodiment of this application. As shown in FIG. 20, identity pictures of 10 virtual objects 2001 to 2010, that is, half-length portraits of 10 heroes are displayed in the object presentation interface 2000. Moreover, an encouragement option 2021 and a triggering option 2022 in an inactive state are further displayed in the object presentation interface 2000. It indicates that the virtual object 2007 corresponding to the current terminal has successfully triggered a special effect, that is, the virtual object 2007 is the first virtual object grabbing the special effect successfully in the current round. When it is set that the current terminal is not allowed to give a like to the current terminal, a social networking interaction option (that is, like giving button) is not displayed in the object presentation interface 2000, but only the triggering option 2022 in the inactive state is displayed. The edge of the triggering option 2022 is actually a countdown control 2023, and the countdown control 2023 is used for recording the remaining display duration of the special effect of the virtual object 2007. In this case, the current terminal receives a target generating instruction broadcast by the server, and a set of IDs of like givers carried in the target generating instruction includes: IDs of the virtual objects 2002, 2006, 2008, and 2009, that is, terminals corresponding to the virtual objects 2002, 2006, 2008, and 2009 initiate a special effect social networking interaction request (that is, like giving request). In this case, the current terminal plays a target special effect 2030 on identity pictures of the virtual objects 2002, 2006, 2008, and 2009, and description is made by using an example in which the target special effect 2030 is thumbs up.

1808. The first terminal plays, when the interaction with the special effect succeeds based on the special effect social networking interaction request, a feedback animation on the social networking interaction option, and sets the social networking interaction option to an inactive state, where the feedback animation is used for indicating that the interaction succeeds based on the special effect social networking interaction request.

In some embodiments, after receiving the target generating instruction, the first terminal may parse the special effect generating instruction to obtain the set of the IDs of the like givers, and determine, when the set of the IDs of the like givers includes the ID of the virtual object corresponding to the first terminal, that the interaction succeeds based on the special effect social networking interaction request; and determine, when the set of the IDs of the like givers does not include the ID of the virtual object corresponding to the first terminal, that the interaction fails based on the special effect social networking interaction request.

When the interaction succeeds based on the special effect social networking interaction request, the social networking interaction option may be set to the inactive state. In this way, even if the user clicks/taps the social networking interaction option because of an incorrect operation during display of the target special effect, an invalid special effect social networking interaction request is not repeatedly transmitted to the server, thereby saving overheads of communication with the server.

In some embodiments, the setting the social networking interaction option to the inactive state means that the first terminal modifies the social networking interaction option from the "enabled" state to the "disabled" state in the UI setting.

In some embodiments, the first terminal may further play a feedback animation on the social networking interaction option. In some embodiments, the target generating instruction further carries an animation ID of the feedback animation, and the first terminal searches, based on the animation ID of the feedback animation, an animation resource corresponding to the animation ID from a local cache or magnetic disk, and plays the animation resource by invoking a play control, thereby playing the feedback animation on the social networking interaction option. For example, the feedback animation is a "thumbs up" icon around a lighting effect.

1809. The first terminal displays a count control of the target special effect in the object presentation interface, where the count control of the target special effect is used for recording a display duration of the target special effect.

In addition to ensuring that the display duration of the target special effect does not exceed the duration threshold, when the display duration of the target special effect is less than the duration threshold, but display of the special effect of the first virtual object has been completed and a new round of special effect contest process is started in this case or loading of the virtual scene has been completed in this case, the first terminal needs to immediately cancel display of the target special effect and cancel display of the social networking interaction option. Usually, the duration threshold of the target special effect is less than the target duration of the special effect of the first virtual object. For example, the target duration is 5 seconds, and the duration threshold is 1 second. The displaying the count control in the presentation interface can remind the user of the display duration of the target special effect, making it convenient for the user to learn the remaining display duration of the target special effect.

1810. The first terminal cancels display of the social networking interaction option in response to a case that it is determined based on the count control that the display duration of the target special effect exceeds a duration threshold.

In some embodiments, when the countdown control indicates that countdown is 0, the first terminal determines that the display duration of the target special effect reaches the duration threshold; or when the count control indicates that count is the duration threshold, the first terminal determines that the display duration of the target special effect reaches the duration threshold. Then, the first terminal cancels display of the social networking interaction option in the object presentation interface. In some embodiments, when the first terminal does not enable the special effect contest function, the triggering option of the special effect is not displayed again in the object presentation interface; and when the first terminal enables the special effect contest function, the triggering option of the special effect is displayed again in the object presentation interface.

In the foregoing process, description is made by using an example in which the target special effect and the special effect of the first virtual object are asynchronously played completely, that is, the target special effect may be played completely before the special effect of the first virtual object. In some embodiments, the first terminal may alternatively not count the display duration of the target special effect, that is, not display the count control of the target special effect, but cyclically play the target special effect, and when display of the special effect of the first virtual object is completed, display of the target special effect and display of the social networking interaction option are canceled simultaneously, so that the special effect of the first virtual object and the target special effect interacting with the special effect can be synchronously played completely.

Figure 21:
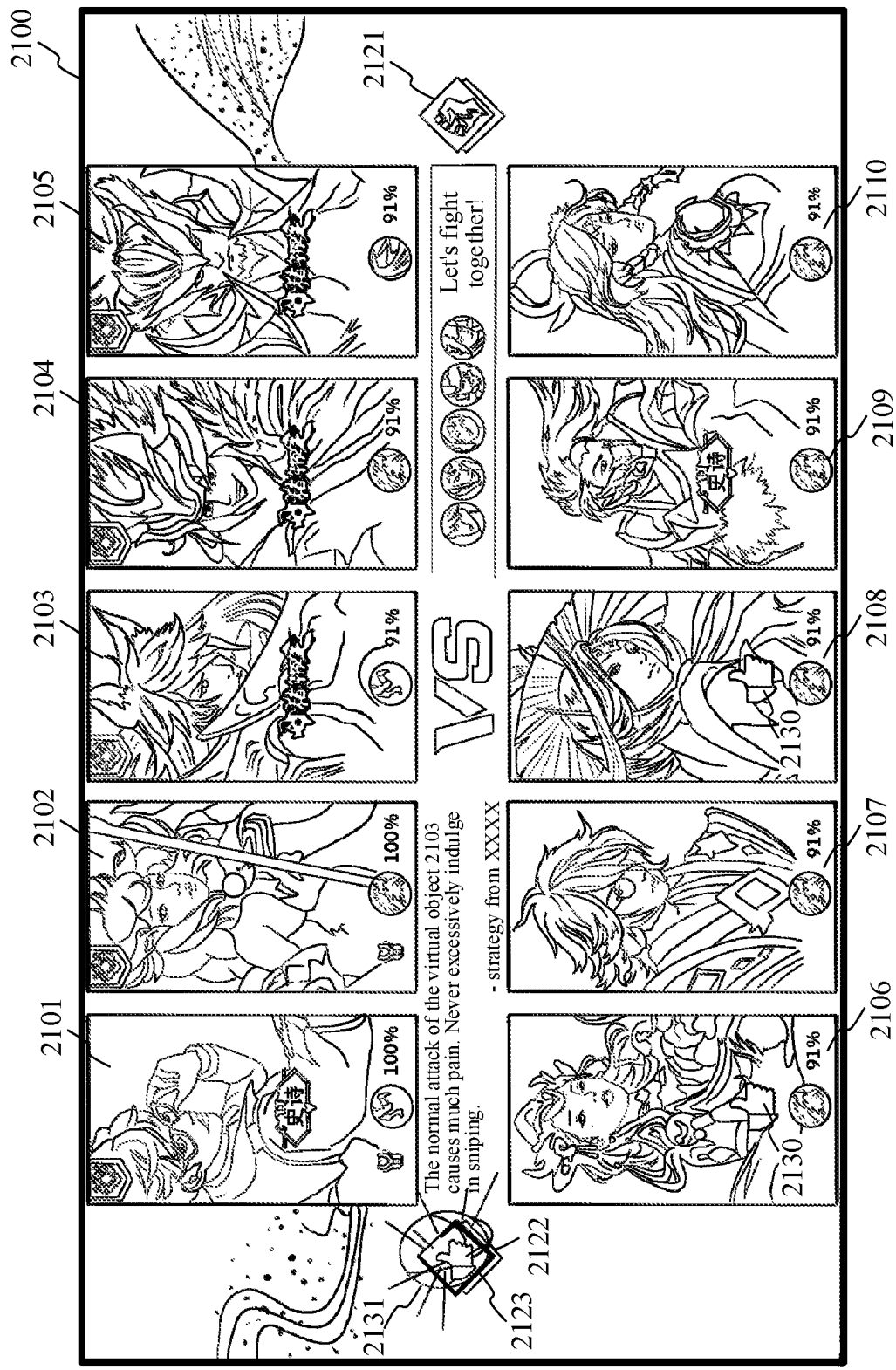
FIG. 21 is a schematic diagram of an object presentation interface according to an embodiment of this application.

FIG. 21 is a schematic diagram of an object presentation interface according to an embodiment of this application. As shown in FIG. 21, identity pictures of 10 virtual objects 2101 to 2110, that is, half-length portraits of 10 heroes are displayed in the object presentation interface 2100. Moreover, an encouragement option 2121 and a social networking interaction option 2122 are further displayed in the object presentation interface 2100. It indicates that the virtual object 2107 corresponding to the current terminal has not successfully triggered a special effect, and the current terminal successfully performs like giving. The current terminal receives a target generating instruction broadcast by the server, and a set of IDs of like givers carried in the target generating instruction includes: IDs of the virtual objects 2106 and 2108, that is, terminals corresponding to the virtual objects 2106 and 2108 initiate a special effect social networking interaction request (that is, like giving request). In this case, the current terminal plays a target special effect 2130 on identity pictures of the virtual objects 2106 and 2108, and description is made by using an example in which the target special effect 2130 is thumbs up. Moreover, a feedback animation 2131 is further played on the social networking interaction option 2122, indicating that the current terminal successfully performs like giving, and description is made by using an example in which the feedback animation 2131 is thumbs up carrying a lighting effect. The edge of the social networking interaction option 2122 is actually a countdown control 2123, and the countdown control 2123 is used for recording the remaining display duration of the target special effect 2130. When countdown of the countdown control 2123 is 0, display of the target special effect 2130 is canceled, and display of the social networking interaction option 2122 is canceled.

All of the above optional technical solutions can be combined randomly to form optional embodiments of this application. Details are not described herein again.

In the method provided in this embodiment of this application, an innovative manner in which the virtual scene is loaded in the target battle to cause the first virtual object to trigger display of a corresponding special effect (including an individual special effect and a team special effect) when the target condition is met is provided. Based on this, interaction that another virtual object performs like giving or the like on the special effect of the first virtual object is further supported. After like giving is performed successfully, the feedback animation can be further played on the social networking interaction option, and the like giver special effect, that is, the target special effect is displayed on the identity picture of the like giver, to provide a rich and interesting social networking interaction manner, thereby greatly improving man-machine interaction efficiency.

In this embodiment of this application, description is made by using an example in which the special effect is referred to as a backdrop, and the backdrop is a name for an innovative social networking interaction process and an innovative social networking interaction experience that is newly added to a loading stage. Virtual objects are displayed in the form of identity pictures in the object presentation interface, and description is made by using an example in which the virtual objects are heroes and the identity pictures are half-length portraits. The backdrop includes an individual special effect presenting a converged lighting effect and a team special effect presenting a galaxy-like ribbon lighting effect. In some embodiments, the individual special effect is presented at an upper layer of a half-length portrait of a hero, and the team special effect is presented at a lower layer of the half-length portrait of the hero.

1. Backdrop Triggering Manner

As shown in FIG. 15, the object presentation interface 1500 refers to the loading interface of the virtual scene, the triggering option 1522 of the interactive backdrop is added in the object presentation interface 1500, the user enables the backdrop contest function through the switching control of the backdrop contest function in the battle start configuration interface, and when the user enables the backdrop contest function, the triggering option 1522 of the backdrop is displayed in the object presentation interface 1500. The user may trigger and present a backdrop special effect (that is, a dynamic background resource) through contesting and clicking/tapping. If a plurality of users click/taps the triggering option 1522 of the backdrop in the same target time period (for example, 0.3 seconds), the server comprehensive determines, according to a decision algorithm, which user grabs the backdrop successfully based on priorities and triggering moments, that is, makes a decision to determine which virtual object is the first virtual object.

When a user grabs the backdrop successfully, the triggering option of the backdrop is weakened, that is, is set to the inactive state. For the triggering option in the inactive state, after the user clicks/taps the triggering option, no interaction response is generated, and the edge of the triggering option in the inactive state is actually a 5-second countdown control, indicating that the grabbed backdrop special effect is displayed for a total of 5 seconds. As shown in FIG. 13, a schematic diagram of an interface in display of the backdrop special effect is shown, the backdrop special effect includes the individual special effect and the team special effect, and the virtual object 1307 successfully grabs the backdrop special effect. Therefore, the individual special effect 1331 with the converged lighting effect is displayed on the half-length portrait of the virtual object 1307. Moreover, the team special effect 1332 with the galaxy-like ribbon lighting effect is further displayed on the background region of the half-length portraits of the virtual objects 1306 to 1310. The individual special effect 1331 and the team special effect 1332 are visible to all users participating in the target battle.

Further, all other users may perform like giving on the user triggering the backdrop special effect, and when another user performs like giving, a like giving animation special effect (the like giver special effect, that is, the target special effect) is displayed on a half-length portrait corresponding to the user initiating like giving (that is, like giver). In some embodiments, the target special effect is played only once. As shown in FIG. 20, like givers include the users corresponding to the virtual objects 2002, 2006, 2008, and 2009, that is, a total of 4 users perform like giving on the backdrop special effect of the virtual object 2007. Then, the target special effect 2030 is played on the half-length portraits of the virtual objects 2002, 2006, 2008, and 2009, and the target special effect 2030 is played only once, and disappears after the play is completed. For example, the target special effect 2030 is thumbs up.

After 5-second countdown of the backdrop special effect ends, the triggering option of the backdrop is restored to an initial state (that is, updated from the inactive state to the active state), and the backdrop special effect disappears. In some embodiments, in a new round of backdrop contest process, the same person is allowed to contest the backdrop special effect again, but a relatively low priority is set for this person, that is, in a plurality of rounds of backdrop contest, the same person is allowed to click/tap for a plurality of times to trigger a plurality of times of playing the backdrop special effect. In this case, the return to the initial state shown in FIG. 15 is made.

2. Like Giving Interaction when the Backdrop is not Adorned

The user disables, based on the switching control of the backdrop contest function, the backdrop contest function in the battle start configuration interface, that is, the terminal corresponding to the user is not adorned with the backdrop. Then, in the initial state, the triggering option of the backdrop is not displayed in the object presentation interface. As shown in FIG. 16, the triggering option of the backdrop is not displayed in the object presentation interface 1600.

After another user in the target battle contests and triggers the backdrop special effect, a like giving key (that is, a social networking interaction option) is displayed on a terminal corresponding to the current user, and 5-second countdown is displayed in the form of a progress bar (the progress bar just encloses an outer edge of the like giving key). As shown in FIG. 19, the virtual object 1902 triggers the backdrop special effect, the individual special effect 1931 is played on the half-length portrait of the virtual object 1902, and the team special effect 1932 is played in the background region of the half-length portraits of the virtual objects 1901 to 1905 in the camp to which the virtual object 1902 belongs. On a terminal corresponding to another user, a like giving key 1922 in a thumb style and a countdown progress 1923 (countdown of a total of 5 seconds) are displayed on a left side of the object presentation interface 1900.

After the user clicks/taps the like giving key, the feedback animation is played on the like giving key, and the target special effect is displayed on a half-length portrait of a virtual object initiating like giving. As shown in FIG. 21, the terminals corresponding to the virtual objects 2106 and 2108 successfully initiate like giving, and then the target special effect 2130 is played on half-length portraits of the virtual objects 2106 and 2108. For example, the target special effect 2130 is thumbs up. Moreover, the feedback animation 2131 is played on the like giving key 2122. For example, the feedback animation 2131 is thumbs up with a lighting effect. Moreover, after the user performs like giving, the like giving key 2122 is weakened (that is, is set to the inactive state), that is, the user cannot repeatedly perform like giving, and when other users still successively perform like giving later, the target special effect 2130 is similarly played on half-length portraits of virtual objects corresponding to the users initiating like giving.

After the 5-second countdown of the target special effect ends (or the target special effect is played once), the return to the initial state shown in FIG. 16 is made, that is, the like giving key is hidden.

3. Like Giving Interaction when the Backdrop is Adorned

The user enables, based on the switching control of the backdrop contest function, the backdrop contest function in the battle start configuration interface, that is, the terminal corresponding to the user is adorned with the backdrop. Then, in the initial state, the triggering option of the backdrop is displayed in the object presentation interface. As shown in FIG. 15, the triggering option 1522 of the interactive backdrop is added in the object presentation interface 1500.

When another user contests the backdrop successfully (that is to say, the current user does not contest the backdrop or contests the backdrop unsuccessfully), the object presentation interface is changed from FIG. 15 to FIG. 19, that is to say, the triggering option 1522 of the backdrop is changed to the new like giving key 1922, and 5-second countdown is displayed in the form of a progress bar (as shown by 1923). In other words, the virtual object 1902 triggers the backdrop special effect, and the virtual object corresponding to the current terminal is not the virtual object 1902. Therefore, a like giving key 1922 in a thumb style and a countdown progress 1923 (countdown of a total of 5 seconds) are displayed on a left side of the object presentation interface 1900 of the current terminal.

After the user clicks/taps the like giving key, the feedback animation is played on the like giving key, and the target special effect is displayed on a half-length portrait of a virtual object initiating like giving. As shown in FIG. 21, the terminals corresponding to the virtual objects 2106 and 2108 successfully initiate like giving, the target special effect 2130 is played on half-length portraits of the virtual objects 2106 and 2108, and the feedback animation 2131 is played on the like giving key 2122. Details are not described herein.

After the 5-second countdown of the target special effect ends (or the target special effect is played once), the return to the initial state shown in FIG. 15 is made, that is, the like giving key 2122 is changed to the triggering option 1522 of the backdrop.

In this embodiment of this application, the triggering manner of the backdrop is described in detail, and the like giving interaction when the user is adorned with the backdrop and the like giving interaction when the user is not adorned with the backdrop are further described separately. When the backdrop is adorned, the triggering option of the backdrop is displayed in the initial state, the triggering option is changed to the like giving key during subsequent like giving interaction, and after countdown ends, the like giving key is changed to the triggering option again; and when the backdrop is not adorned, the triggering option of the backdrop is not displayed in the initial state, the like giving key is added during subsequent like giving interaction, and after countdown ends, the like giving key is hidden.

Figure 22:
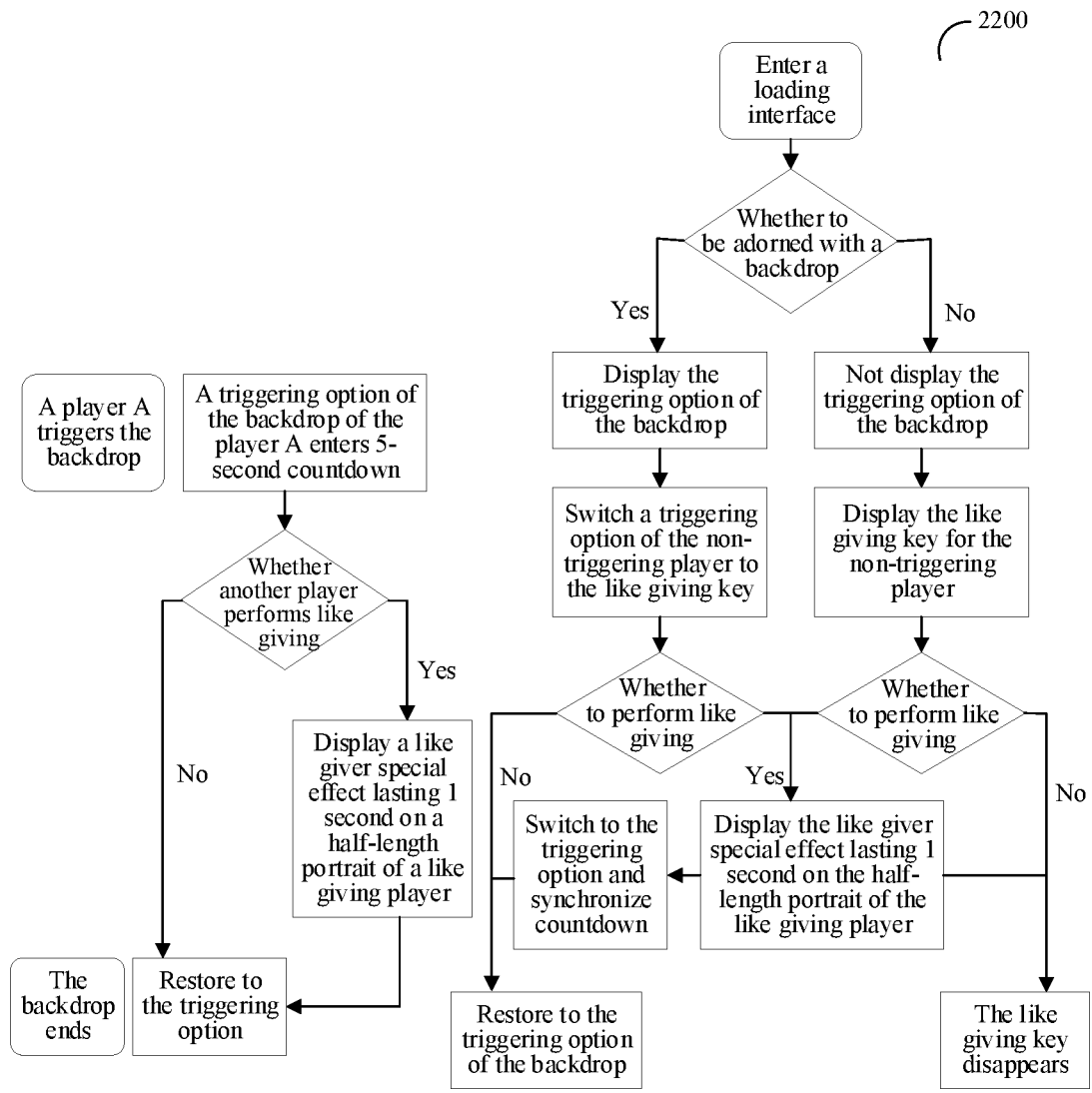
FIG. 22 is a flowchart of key display and change according to an embodiment of this application.

FIG. 22 is a flowchart of key display and change according to an embodiment of this application. As shown in 2200, after entering an object presentation interface (that is, loading interface), a terminal detects whether a user is adorned with a backdrop, that is, detects whether the user enables a backdrop contest function. If the user is not adorned with the backdrop, a triggering option of the backdrop is not displayed. If the user is adorned with the backdrop, the triggering option is displayed. After a user triggers a backdrop special effect, when the user is not adorned with the backdrop, a like giving key is displayed for a user not triggering the backdrop special effect (briefly referred to as a non-triggering player below); and when the user is adorned with the backdrop, a triggering option of the non-triggering player is switched to the like giving key. The terminal detects whether a user performs like giving. When a user performs like giving, a target special effect (that is, like giver special effect) lasting 1 second is displayed on a half-length portrait of a virtual object of the user. After play of the target special effect is completed, when the user is not adorned with the backdrop, the like giving key disappears (or is hidden); and when the user is adorned with the backdrop, the like giving key is switched back to the triggering option, and when countdown of the backdrop special effect is synchronized, restoration to the triggering option the active state is made when countdown ends.

Further, a player A triggering the backdrop is different from a non-triggering player in changes of a key in the object presentation interface. After the player A triggers the backdrop, a triggering option of the backdrop on a terminal of the player A enters 5-second countdown. In this case, it is determined whether another player performs like giving. When another player performs like giving, a like giver special effect lasting 1 second is displayed on a half-length portrait of a virtual object of the like giving player, restoration to the triggering option (in the inactive state) is made at the end of 1 second; and when no other player performs like giving, the triggering option (in the inactive state) is always being kept, until play of the backdrop special effect is completed, that is, the backdrop ends.

In other words, in the object presentation interface of the client, there are the following three key change paths:

Key change path 1: after the player A clicks/taps the triggering option of the backdrop, among 9 other players, for an outside player that is adorned with the backdrop and for which the triggering option is displayed, the triggering option is changed to the like giving key; and for an outside player that is not adorned with the backdrop and for which the triggering option is not displayed, the like giving key is directly displayed in a key location.

Key change path 2: after a player clicks/taps the like giving key and play of the target special effect is completed, for an outside player that is adorned with the backdrop and for which the triggering option is displayed, the like giving key is changed to the triggering option, and a countdown progress of the triggered backdrop special effect is normally displayed, which is consistent with a state (inactive state) of the triggering option of the triggering player A in this case. For an outside player that is not adorned with the backdrop and for which the triggering option is not displayed, the like giving key disappears (or is hidden).

Key change path 3: when no player clicks/taps the like giving key, for an outside player that is adorned with the backdrop and for which the like giving key is displayed, the like giving key is changed to the triggering option after 5 seconds; and for an outside player that is not adorned with the backdrop and for which the like giving key is displayed, the like giving key disappears (or is hidden) after 5 seconds.

In comprehensive consideration of the foregoing embodiments, the process of the triggering manner and the interaction manner of the backdrop special effect is summarized:

Step 1. A player in a different camp initiates, after entering loading of a virtual scene or cool down of a previous round of backdrop contest ends, a backdrop contest request (that is, special effect triggering request) to the server by clicking/tapping the triggering option of the backdrop.

Step 2. After receiving the backdrop contest request of the first player, the server determines a triggering person (that is, the first virtual object) in the current round.

Step 3. The server broadcasts a backdrop play message (that is, the special effect generating instruction) to clients of all players, where the backdrop plays message includes at least an ID of the triggering person, an effect ID of the triggered backdrop, and a triggering moment of the backdrop. The ID of the triggering person is the ID of the first virtual object, and the effect ID of the triggered backdrop is the effect ID of the special effect.

Step 4. When receiving the backdrop play message, all the clients begin to play a representation effect of the backdrop (that is, display the backdrop special effect), and start countdown based on the triggering moment delivered by the server, in other words, all the clients synchronously start a new cool down (CD) duration.

Step 5. During play of the backdrop special effect, the players may transmit a like giving request (that is, special effect social networking interaction request) for the triggering person to the server, and the server broadcasts and forwards the like giving request to the clients of all the players, where forwarded information includes at least the set of the IDs of the like givers, and the ID of the like taker.

Step 6. All the clients play the like giver special effect and the like taker special effect that is the feedback animation.

Step 7. CD ends, to start a next cycle.

In this embodiment of this application, taking a MOBA game as an example, a manner in which an individual shows off and a team shows off can be provided to users in a scene loading stage on a core experience path of the MOBA game, to promote social networking interaction between players and improve operability and interestingness of loading a scene, and a corresponding representation resource (that is, backdrop special effect) may be further used for performing commercialization/other activity output (for example, playing an advertisement), thereby promoting user activation and income increase.

Figure 23:
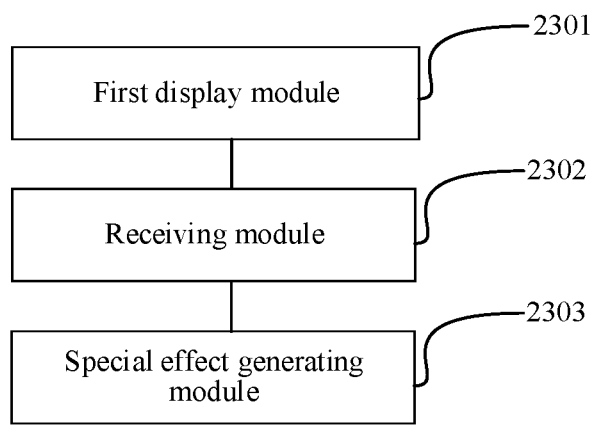
FIG. 23 is a schematic structural diagram of an apparatus for generating a special effect in a virtual environment according to an embodiment of this application.

FIG. 23 is a schematic structural diagram of an apparatus for generating a special effect in a virtual environment according to an embodiment of this application. Referring to FIG. 23, the apparatus includes:

a first display module 2301, configured to display an object presentation interface of a target battle, the object presentation interface being used for displaying a plurality of virtual objects participating in the target battle;

a receiving module 2302, configured to receive a special effect generating instruction for a first virtual object of the plurality of virtual objects, the special effect generating instruction being used for instructing to generate a special effect based on the first virtual object, and the first virtual object being corresponding to the electronic device triggering the special effect; and a special effect generating module 2303, configured to generate the special effect in the object presentation interface.

Based on the apparatus provided in this embodiment of this application, a corresponding special effect is displayed based on the first virtual object corresponding to the terminal triggering the special effect in the object presentation interface of the target battle, so that in a process of presenting virtual objects participating in the target battle, an innovative social networking interaction manner based on a special effect is provided, and a positive game feedback is provided in the object presentation interface, thereby improving the man-machine interaction effect.

In some implementations, the special effect includes a first special effect, the first special effect is a special effect of the first virtual object, and the special effect generating module 2303 is configured to:

generate the first special effect on an identity picture of the first virtual object in the object presentation interface.

In some implementations, the special effect includes a second special effect, the second special effect is a special effect of a camp to which the first virtual object belongs, and the special effect generating module 2303 is configured to:

determine a second virtual object from the plurality of virtual objects, where the second virtual object and the first virtual object belong to the same camp; and generate the second special effect in a background region in which identity pictures of the first virtual object and the second virtual object are located.

In some implementations, the apparatus further includes:
a second display module, configured to display a count control of the special effect in the object presentation interface, where the count control of the special effect is used for recording a display duration of the special effect.

In some implementations, the apparatus further includes:
a third display module, configured to display a triggering option of the special effect in the object presentation interface; and
a first transmitting module, configured to transmit a special effect triggering request in response to a triggering operation on the triggering option, where the special effect triggering request is used for requesting to trigger the special effect.

In some implementations, the apparatus further includes:
a setting module, configured to set the triggering option to an inactive state when the special effect is successfully triggered based on the special effect triggering request.

In some implementations, the setting module is further configured to:
set the triggering option from the inactive state to an active state in response to a case that a display duration of the special effect exceeds a target duration.

In some implementations, the apparatus further includes:
a fifth display module, configured to display a social networking interaction option in the object presentation interface, where the social networking interaction option is used for providing a social networking interaction function for the special effect of the first virtual object; and
a second transmitting module, configured to transmit a special effect social networking interaction request in response to a triggering operation on the social networking interaction option, where the special effect social networking interaction request is used for instructing to perform interaction with the special effect of the first virtual object.

In some implementations, the apparatus further includes:
a play and setting module, configured to play, when the interaction with the special effect succeeds based on the special effect social networking interaction request, a feedback animation on the social networking interaction option, and set the social networking interaction option to an inactive state, where the feedback animation is used for indicating that the interaction succeeds based on the special effect social networking interaction request.

In some implementations, the receiving module 2302 is further configured to: receive a target generating instruction for a third virtual object of the plurality of virtual objects, where the target generating instruction is used for instructing to generate a target special effect based on the third virtual object, and the third virtual object is a virtual object triggering to perform interaction with the special effect of the first virtual object; and the special effect generating module 2303 is further configured to generate the target special effect in the object presentation interface, where the target special effect is a special effect of the third virtual object for performing interaction with the special effect of the first virtual object.

In some implementations, the apparatus further includes:
a sixth display module, configured to display a count control of the target special effect in the object presentation interface, where the count control of the target special effect is used for recording a display duration of the target special effect.

In some implementations, the first display module 2301 is configured to:
load a virtual scene corresponding to the target battle in response to a battle start operation on the target battle; and
display the object presentation interface during loading of the virtual scene.

All of the above optional technical solutions can be combined randomly to form optional embodiments of this application. Details are not described herein again.

The division of the above functional modules is only described for exemplary purposes when the apparatus for generating a special effect in a virtual environment provided in the foregoing embodiment displays a special effect. In actual application, the functions may be allocated to different functional modules according to specific needs, which means that the internal structure of the electronic device is divided into different functional modules to complete all or some of the above-described functions. In addition, the embodiments of the apparatus for generating a special effect in a virtual environment and the method for generating a special effect in a virtual environment provided in the foregoing embodiments belong to the same conception. For the specific implementation process, reference may be made to the embodiments of the method for generating a special effect in a virtual environment, and details are not described herein again.

Figure 24:
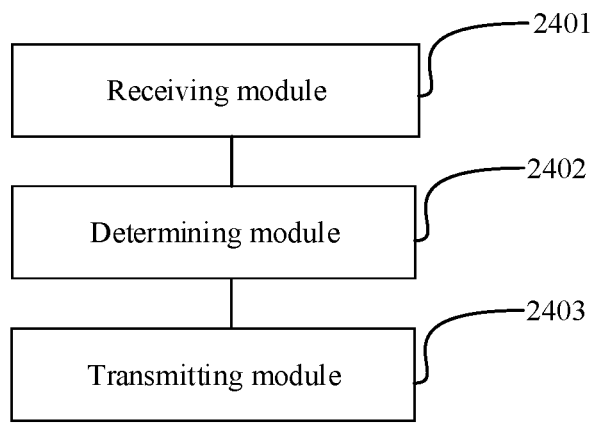
FIG. 24 is a schematic structural diagram of an apparatus for generating a special effect in a virtual environment according to an embodiment of this application.

FIG. 24 is a schematic structural diagram of an apparatus for generating a special effect in a virtual environment according to an embodiment of this application. As shown in FIG. 24, the apparatus includes:

a receiving module 2401, configured to receive at least one special effect triggering request, the special effect triggering request being used for requesting to trigger a special effect of a corresponding virtual object;

a determining module 2402, configured to determine a first virtual object meeting a target condition in at least one virtual object corresponding to the at least one special effect triggering request; and a transmitting module 2403, configured to transmit a special effect generating instruction for the first virtual object, the special effect generating instruction being used for instructing to display the special effect based on the first virtual object.

Based on the apparatus provided in this embodiment of this application, special effect triggering requests of terminals are received, the first virtual object is screened from virtual objects corresponding to the special effect triggering requests, and the special effect generating instruction is transmitted to the terminals participating in the target battle, so that the terminals can display the corresponding special effect based on the first virtual object, that is, an innovative social networking interaction manner based on a special effect is provided, and a positive game feedback is provided, thereby improving man-machine interaction effect.

In some implementations, the determining module 2402 includes:
- a first determining unit, configured to determine a target camp to which a historical virtual object triggering the special effect last time belongs;
- an obtaining unit, configured to obtain at least one historical triggering situation of the at least one virtual object for the special effect; and
- a second determining unit, configured to determine the first virtual object meeting the target condition based on the at least one historical triggering situation and the target camp.

In some implementations, the second determining unit is configured to:
- determine a priority of the at least one virtual object based on the at least one historical triggering situation and the target camp; and
- select, from virtual objects with a highest priority, a virtual object with an earliest triggering moment as the first virtual object.

In some implementations, the priority includes a first priority, a second priority, a third priority, and a fourth priority. The first priority means that a virtual object does not belong to the target camp and a historical triggering situation is non-triggered; the second priority means that a virtual object belongs to the target camp and a historical triggering situation is non-triggered; the third priority means that a virtual object does not belong to the target camp and a historical triggering situation is triggered; and the fourth priority means that a virtual object belongs to the target camp and a historical triggering situation is triggered.

In some implementations, the receiving module 2401 is further configured to receive at least one special effect social networking interaction request, where the special effect social networking interaction request is used for instructing to perform interaction with the special effect of the first virtual object;
- the determining module 2402 is further configured to determine at least one virtual object corresponding to the at least one special effect social networking interaction request as a third virtual object; and
- the transmitting module 2403 is further configured to transmit a target generating instruction, the target generating instruction being used for instructing to generate a target special effect based on the third virtual object, and the target special effect being a special effect of the third virtual object for performing interaction with the special effect of the first virtual object.

In some implementations, the receiving module 2401 is configured to:
- determine a target time period when a first special effect triggering request is received, where the target time period takes a receiving moment of the first special effect triggering request as a start moment and a moment with a target time interval after the start moment as an end moment; and
- obtain the at least one special effect triggering request received in the target time period.

All of the above optional technical solutions can be combined randomly to form optional embodiments of this application. Details are not described herein again.

The division of the above functional modules is only described for exemplary purposes when the apparatus for generating a special effect in a virtual environment provided in the foregoing embodiment displays a special effect. In actual application, the functions may be allocated to different functional modules according to specific needs, which means that the internal structure of the electronic device is divided into different functional modules to complete all or some of the above-described functions. In addition, the embodiments of the apparatus for generating a special effect in a virtual environment and the method for generating a special effect in a virtual environment provided in the foregoing embodiments belong to the same conception. For the specific implementation process, reference may be made to the embodiments of the method for generating a special effect in a virtual environment, and details are not described herein again.

Figure 25:
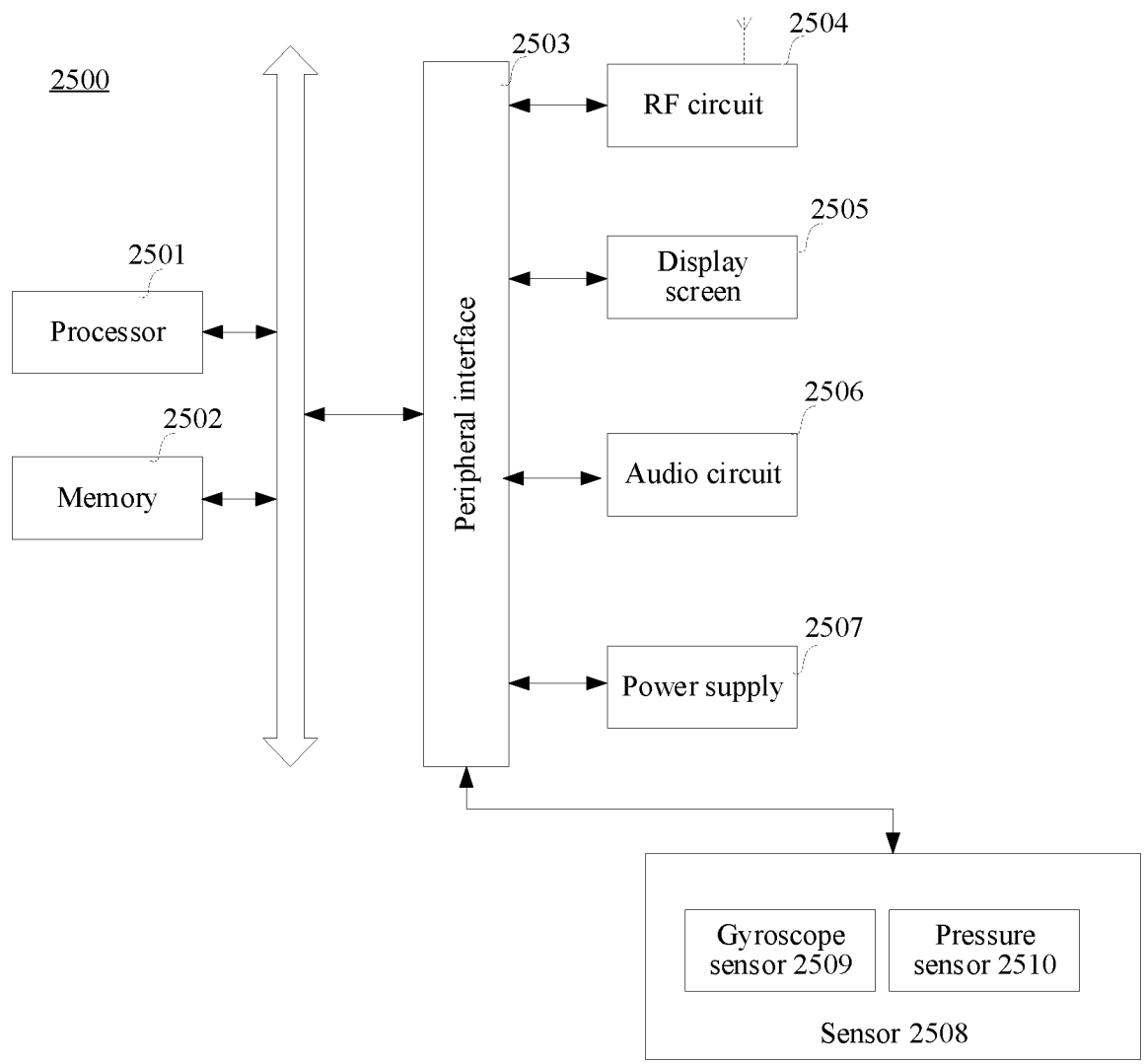
FIG. 25 is a schematic structural diagram of an electronic device according to an embodiment of this application.

FIG. 25 is a schematic structural diagram of an electronic device according to an embodiment of this application. As shown in FIG. 25, description is made by using an example in which the electronic device is a terminal 2500, and the terminal 2500 is any terminal (for example, a first terminal) participating in a target battle. In some embodiments, the device type of the terminal 2500 includes: a smartphone, a smart handheld game console, a portable game device, a tablet computer, a notebook computer, a desktop computer, a smartwatch, or the like, but is not limited thereto.

Generally, the terminal 2500 includes: a processor 2501 and a memory 2502.

In some embodiments, the processor 2501 may include one or more processing cores, for example, may be a 4-core processor or an 8-core processor. In some embodiments, the processor 2501 is integrated with a graphics processing unit (GPU). The GPU is configured to render and draw content that needs to be displayed on a display screen.

In some embodiments, the memory 2502 includes one or more computer-readable storage media. In some embodiments, a non-transient computer-readable storage medium in the memory 2502 is configured to store at least one piece of program code, and the at least one piece of program code is configured to be executed by the processor 2501 to implement the method for generating a special effect in a virtual environment provided in the embodiments of this application.

In some embodiments, the terminal 2500 optionally includes a peripheral interface 2503 and at least one peripheral. The processor 2501, the memory 2502, and the peripheral interface 2503 may be connected through a bus or a signal cable. Each peripheral may be connected to the peripheral interface 2503 by a bus, a signal cable, or a circuit board. Specifically, the peripheral includes at least one of a radio frequency circuit 2504, a display screen 2505, an audio circuit 2506, and a power supply 2507.

The peripheral interface 2503 may be configured to connect the at least one peripheral related to input/output (I/O) to the processor 2501 and the memory 2502.

The RF circuit 2504 is configured to receive and transmit an RF signal, also referred to as an electromagnetic signal. The RF circuit 2504 communicates with a communication network and other communication devices through the electromagnetic signal. The RF circuit 2504 converts an electrical signal into an electromagnetic signal for transmission, or converts a received electromagnetic signal into an electrical signal. In some embodiments, the RF circuit 2504 includes: an antenna system, an RF transceiver, one or more amplifiers, a tuner, an oscillator, a DSP, a codec chip set, and a subscriber identity module card. In some embodiments, the RF circuit 2504 may communicate with other terminals through at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. The display screen 2505 is configured to display a user interface (UI). In some embodiments, the UI may include a graph, a text, an icon, a video, and any combination thereof. When the display screen 2505 is a touch display screen, the display screen 2505 is further capable of collecting touch signals on or above a surface of the display screen 2505. The touch signal may be inputted to the processor 2501 for processing as a control signal.

In some embodiments, the audio circuit 2506 includes a microphone and a speaker. The microphone is configured to acquire sound waves of a user and an environment, and convert the sound waves into an electrical signal to input to the processor 2501 for processing, or input to the radio frequency circuit 2504 for implementing voice communication.

The power supply 2507 is configured to supply power to components in the terminal 2500. In some embodiments, the power supply 2507 is an alternating current, a direct current, a disposable battery, or a rechargeable battery. When the power supply 2507 includes a rechargeable battery, the rechargeable battery is a wired rechargeable battery or a wireless rechargeable battery. The rechargeable battery is further configured to support a fast charge technology.

In some embodiments, the terminal 2500 further includes one or more sensors 2508. The one or more sensors 2508 include, but are not limited to: a gyroscope sensor 2509 and a pressure sensor 2510.

In some embodiments, the gyroscope sensor 2509 detects a body direction and a rotation angle of the terminal 2500. The gyroscope sensor 2509 acquires a 3D action of the user on the terminal 2500 together with the acceleration sensor 2511. The processor 2501 implements the following functions according to the data acquired by the gyroscope sensor 2509: motion sensing (such as changing the UI according to a tilt operation of the user), image stabilization at shooting, game control, and inertial navigation.

In some embodiments, the pressure sensor 2510 is disposed at a side frame of the terminal 2500 and/or a lower layer of the display screen 2505. When the pressure sensor 2510 is disposed on the side frame of the terminal 2500, a holding signal of the user to the terminal 2500 may be detected, and left/right hand identification or a quick action may be performed by the processor 2501 according to the holding signal acquired by the pressure sensor 2510. When the pressure sensor 2510 is disposed on the low layer of the display screen 2505, the processor 2501 controls, according to a pressure operation of the user on the display screen 2505, an operable control on the UI. The operable control includes at least one of a button control, a scroll-bar control, an icon control, and a menu control.

A person skilled in the art can understand that the structure shown in FIG. 25 does not constitute a limitation to the terminal 2500, and the terminal may include more or fewer components than those shown in the figure, or some components may be combined, or a different component arrangement may be used.

Figure 26:
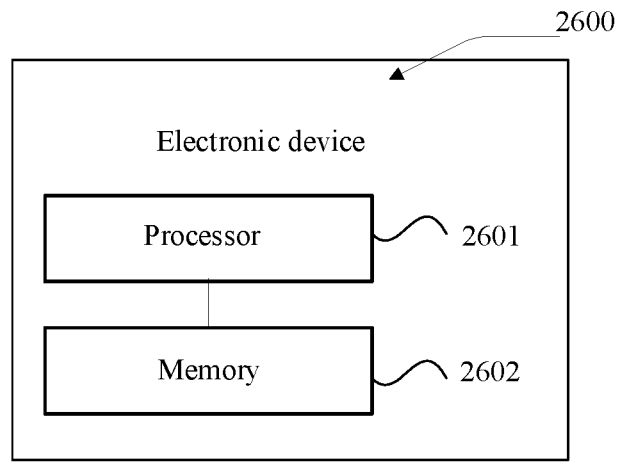
FIG. 26 is a schematic structural diagram of an electronic device according to an embodiment of this application.

FIG. 26 is a schematic structural diagram of an electronic device according to an embodiment of this application. For example, the electronic device 2600 is the server in the foregoing embodiments. The electronic device 2600 may vary greatly due to different configurations or different performance, and the electronic device 2600 includes one or more central processing units (CPUs) 2601 and one or more memories 2602. The memory 2602 stores at least one computer program, the at least one computer program being loaded and executed by the one or more processors 2601 to implement the method for generating a special effect in a virtual environment provided in the foregoing embodiments. In some embodiments, the electronic device 2600 further includes components such as a wired or wireless network interface, a keyboard, and an input/output (I/O) interface, to facilitate input and output. The electronic device 2600 further includes another component configured to implement a function of a device. Details are not further described herein.

In an exemplary embodiment, a computer-readable storage medium, for example, a memory including at least one computer program is further provided. The at least one computer program may be executed by a processor in a terminal to implement the method for generating a special effect in a virtual environment in the foregoing embodiments. For example, the computer-readable storage medium includes a read-only memory (ROM), a random access memory (RAM), a compact disc read-only memory (CD-ROM), a magnetic tape, a floppy disk, an optical data storage device, or the like.

In an exemplary embodiment, a computer program product or a computer program is further provided, including one or more pieces of program code, the one or more pieces of program code being stored in a computer-readable storage medium. One or more processors of an electronic device can read the one or more pieces of program code from the computer-readable storage medium, and the one or more processors execute the one or more pieces of program code to enable the electronic device to perform the method for generating a special effect in a virtual environment in the foregoing embodiments.

A person of ordinary skill in the art may understand that all or some of the steps of the foregoing embodiments may be implemented by hardware or may be implemented by a program instructing relevant hardware. In some embodiments, the program is stored in a computer-readable storage medium. In some embodiments, the storage medium mentioned above is a ROM, a magnetic disk, an optical disc, or the like. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for generating a special effect for social networking interaction in a virtual environment of a game performed by an electronic device, the method comprising:
   displaying an object presentation interface of a target battle of the game when loading a virtual scene corresponding to the target battle, the object presentation interface being used for displaying a plurality of virtual objects participating in the target battle;
   receiving a special effect generating instruction for a first virtual object of the plurality of virtual objects, the special effect generating instruction being used for instructing to generate a special effect based on the first virtual object, and the first virtual object corresponding to a user of the electronic device triggering the special effect; and
   generating the special effect identifying the first virtual object in the object presentation interface.

2. The method according to claim 1, wherein the special effect comprises a first special effect, the first special effect is a special effect of the first virtual object, and the generating the special effect adjacent the first virtual object in the object presentation interface comprises:
   generating the first special effect on an identity picture of the first virtual object in the object presentation interface.

3. The method according to claim 1, wherein the special effect comprises a second special effect, the second special effect is a special effect of a camp to which the first virtual object belongs, and the generating the special effect identifying the first virtual object in the object presentation interface comprises:
   determining a second virtual object from the plurality of virtual objects, wherein the second virtual object and the first virtual object belong to the same camp; and
   generating the second special effect in a background region in which identity pictures of the first virtual object and the second virtual object are located.

4. The method according to claim 1, further comprising:
   displaying a count control of the special effect in the object presentation interface, wherein the count control of the special effect is used for recording a display duration of the special effect.

5. The method according to claim 1, wherein before the receiving a special effect generating instruction for a first virtual object of the plurality of virtual objects, the method further comprises:
   displaying a triggering option of the special effect in the object presentation interface; and
   generating a special effect triggering request in response to a triggering operation on the triggering option and transmitting the special effect triggering request to a remote server, wherein the special effect triggering request is used for requesting the remote server to trigger the special effect at electronic devices associated with the others of the plurality of virtual objects participating in the target battle.

6. The method according to claim 5, wherein after the displaying a triggering option of the special effect, the method further comprises:
   setting the triggering option to an inactive state when the special effect is successfully triggered based on the special effect triggering request.

7. The method according to claim 6, wherein after the setting the triggering option to an inactive state, the method further comprises:
   setting the triggering option from the inactive state to an active state in response to a case that a display duration of the special effect exceeds a target duration.

8. The method according to claim 1, wherein after the generating the special effect identifying the first virtual object in the object presentation interface, the method further comprises:
   displaying a social networking interaction option in the object presentation interface, wherein the social networking interaction option is used for providing a social networking interaction function for the special effect of the first virtual object; and
   generating a special effect social networking interaction request in response to a triggering operation on the social networking interaction option and transmitting the special effect social networking interaction request to a remote server, wherein the special effect social networking interaction request is used by the remote server for instructing the others of the plurality of virtual objects participating in the target battle to perform interaction with the special effect of the first virtual object.

9. The method according to claim 8, wherein after the displaying a social networking interaction option in the object presentation interface, the method further comprises:
   playing, when the interaction with the special effect succeeds based on the special effect social networking interaction request, a feedback animation on the social networking interaction option, and setting the social networking interaction option to an inactive state, wherein the feedback animation is used for indicating that the interaction succeeds based on the special effect social networking interaction request.

10. The method according to claim 1, wherein after the generating the special effect identifying the first virtual object in the object presentation interface, the method further comprises:
    receiving a target generating instruction for a third virtual object of the plurality of virtual objects, wherein the target generating instruction is used for instructing to generate a target special effect based on the third virtual object, and the third virtual object is a virtual object triggering to perform interaction with the special effect of the first virtual object; and
    generating the target special effect adjacent the third virtual object in the object presentation interface, wherein the target special effect is a special effect of the third virtual object for performing interaction with the special effect of the first virtual object.

11. The method according to claim 10, further comprising:
    displaying a count control of the target special effect in the object presentation interface, wherein the count control of the target special effect is used for recording a display duration of the target special effect.

12. The method according to claim 1, wherein the game is a multiplayer game.

13. The method according to claim 1, wherein the virtual scene corresponding to the target battle is loaded in response to a battle start operation on the target battle of the game.

14. An electronic device, comprising one or more processors and one or more memories, the one or more memories storing at least one computer program, the at least one computer program being loaded and executed by the one or more processors to cause the electronic device to perform a method for generating a special effect for social networking interaction in a virtual environment of a game including:

displaying an object presentation interface of a target battle of the game when loading a virtual scene corresponding to the target battle, the object presentation interface being used for displaying a plurality of virtual objects participating in the target battle;

receiving a special effect generating instruction for a first virtual object of the plurality of virtual objects, the special effect generating instruction being used for instructing to generate a special effect based on the first virtual object, and the first virtual object corresponding to a user of the electronic device triggering the special effect; and generating the special effect identifying the first virtual object in the object presentation interface.

15. The electronic device according to claim 14, wherein the special effect comprises a first special effect, the first special effect is a special effect of the first virtual object, and the generating the special effect identifying the first virtual object in the object presentation interface comprises:

generating the first special effect on an identity picture of the first virtual object in the object presentation interface.

16. The electronic device according to claim 14, wherein the special effect comprises a second special effect, the second special effect is a special effect of a camp to which the first virtual object belongs, and the generating the special effect identifying the first virtual object in the object presentation interface comprises:

determining a second virtual object from the plurality of virtual objects, wherein the second virtual object and the first virtual object belong to the same camp; and generating the second special effect in a background region in which identity pictures of the first virtual object and the second virtual object are located.

17. The electronic device according to claim 14, wherein the method further comprises:

displaying a count control of the special effect in the object presentation interface, wherein the count control of the special effect is used for recording a display duration of the special effect.

18. The electronic device according to claim 14, wherein before the receiving a special effect generating instruction for a first virtual object of the plurality of virtual objects, the method further comprises:

displaying a triggering option of the special effect in the object presentation interface; and generating a special effect triggering request in response to a triggering operation on the triggering option and transmitting the special effect triggering request to a remote server, wherein the special effect triggering request is used for requesting the remote server to trigger the special effect at electronic devices associated with the others of the plurality of virtual objects participating in the target battle.

19. The electronic device according to claim 14, wherein after the generating the special effect identifying the first virtual object in the object presentation interface, the method further comprises:

displaying a social networking interaction option in the object presentation interface, wherein the social networking interaction option is used for providing a social networking interaction function for the special effect of the first virtual object; and generating a special effect social networking interaction request in response to a triggering operation on the social networking interaction option and transmitting the special effect social networking interaction request to a remote server, wherein the special effect social networking interaction request is used by the remote server for instructing the others of the plurality of virtual objects participating in the target battle to perform interaction with the special effect of the first virtual object.

20. A non-transitory computer readable storage medium, storing at least one computer program, the at least one computer program being loaded and executed by a processor of an electronic device to cause the electronic device to perform a method for generating a special effect for social networking interaction in a virtual environment of a game including:

displaying an object presentation interface of a target battle of the game when loading a virtual scene corresponding to the target battle, the object presentation interface being used for displaying a plurality of virtual objects participating in the target battle;

receiving a special effect generating instruction for a first virtual object of the plurality of virtual objects, the special effect generating instruction being used for instructing to generate a special effect based on the first virtual object, and the first virtual object corresponding to a user of the electronic device triggering the special effect; and generating the special effect identifying the first virtual object in the object presentation interface.

* * * * *